United States Patent [19]

Gabriele

[11] Patent Number: 4,825,721
[45] Date of Patent: May 2, 1989

[54] METHOD AND APPARATUS FOR POWER TRANSMISSION FROM AN ENGINE

[76] Inventor: Darcy Gabriele, 1890 Fifth Ave., Prince George, British Columbia, Canada, V2M 1J5

[21] Appl. No.: 846,369

[22] Filed: Mar. 31, 1986

Related U.S. Application Data

[63] Continuation-in-part of Ser. No. 361,359, Mar. 24, 1982, Pat. No. 4,579,019, which is a continuation-in-part of Ser. No. 137,428, Apr. 4, 1980, abandoned.

[30] Foreign Application Priority Data

Mar. 27, 1981 [CA] Canada .................................. 374035

[51] Int. Cl.4 ............................................ F16H 37/06
[52] U.S. Cl. ........................................ 74/675; 74/688
[58] Field of Search ............................................ 74/675

[56] References Cited

U.S. PATENT DOCUMENTS

| | | | |
|---|---|---|---|
| 855,623 | 6/1907 | Emerson | 74/675 |
| 981,689 | 1/1911 | Rhodes | 74/689 |
| 1,203,265 | 10/1916 | Radcliffe | 74/688 |
| 2,227,801 | 1/1941 | Trofimov | 74/675 |
| 2,436,582 | 2/1948 | Lear | 74/675 |
| 3,049,945 | 8/1962 | Lindsay | 74/759 |
| 3,143,898 | 8/1964 | Evernden | 74/688 |
| 3,199,374 | 8/1965 | O'Malley et al. | 74/688 |
| 3,400,609 | 9/1968 | Utter | 74/688 |
| 3,732,751 | 5/1973 | Berman et al. | 74/675 |
| 4,014,222 | 3/1977 | Brandt | 74/687 |
| 4,233,858 | 11/1980 | Rowlett | 74/675 |

FOREIGN PATENT DOCUMENTS

| | | |
|---|---|---|
| 126756 | 2/1948 | Australia . |
| 250325 | 3/1964 | Australia . |
| 55962 | 12/1970 | Australia . |
| 493354 | 6/1978 | Australia . |
| 808912 | 3/1969 | Canada . |
| 819410 | 8/1969 | Canada . |
| 831253 | 1/1970 | Canada . |
| 831255 | 1/1970 | Canada . |
| 884640 | 11/1971 | Canada . |

(List continued on next page.)

OTHER PUBLICATIONS

"Die Planetenrad-Umlaufradergetriebe," Hugo Klein VDI, Carl Hanser Verlag Munchen 1962, pp. 183–185.
"Die Umlaufgetriebe," Herbert W. Muller, Springer-Verlag 1971, 4pp., (English translation attached).
"Automatische Automobilgetriebe," Prof. Dr. Josef Stuper, Springer-Verlag 1965, 2pp.
"Characteristics of Multiple Range Hydromechanical Transmissions," Eli Orshansky and William E. Weseloh, 1972, 12pp.

Primary Examiner—Dirk Wright
Attorney, Agent, or Firm—Klarquist, Sparkman, Campbell, Leigh & Whinston

[57] ABSTRACT

An apparatus for transmitting rotary power includes first and second discret sources of rotary power and a pair of intercoupled first and secondary planetary gear assemblies, each having a primary driving member, secondary driving member and driven follower member. The primary driving member, secondary driving member and driven follower member correspond to one of the following elements: ring gear, sun gear and planetary carrier cage. The primary driving member of the first gear assembly is driven by the first source of rotary power. The secondary driving members of both gear assemblies are driven by the second source of rotary power. The driven follower member of the first assembly is coupled to the primary driving member of the second assembly and the driven follower member of the second assembly, which drives the output shaft, is other than the carrier cage. A drive shaft velocity control controls the absolute speed of at least one of the first and second sources of rotary power without affecting the speed of the other. The relative speeds of the two sources of rotary power can be controlled within a narrow speed range close to the optimum speed of the power source(s) employed and yet produce a broad range of output speeds at the output shaft.

3 Claims, 8 Drawing Sheets

FOREIGN PATENT DOCUMENTS

| | | |
|---|---|---|
| 899657 | 5/1972 | Canada . |
| 931784 | 8/1973 | Canada . |
| 458155 | 3/1928 | Fed. Rep. of Germany ........ 74/675 |
| 130064 | 5/1932 | Fed. Rep. of Germany . |
| 572897 | 3/1933 | Fed. Rep. of Germany ........ 74/675 |
| 910371 | 5/1954 | Fed. Rep. of Germany . |
| 208238 | 3/1960 | Fed. Rep. of Germany ........ 74/675 |
| 979115 | 4/1951 | France ................................. 74/675 |
| 1060637 | 4/1954 | France . |
| 1530736 | 6/1968 | France . |
| 1586747 | 2/1970 | France . |
| 54-13864 | 2/1979 | Japan ................................... 74/675 |
| 452303 | 5/1968 | Switzerland . |
| .751140 | 6/1956 | United Kingdom . |
| 877107 | 9/1961 | United Kingdom ................. 74/675 |
| 1101131 | 1/1968 | United Kingdom . |
| 1305393 | 1/1973 | United Kingdom . |
| 1436491 | 5/1976 | United Kingdom . |

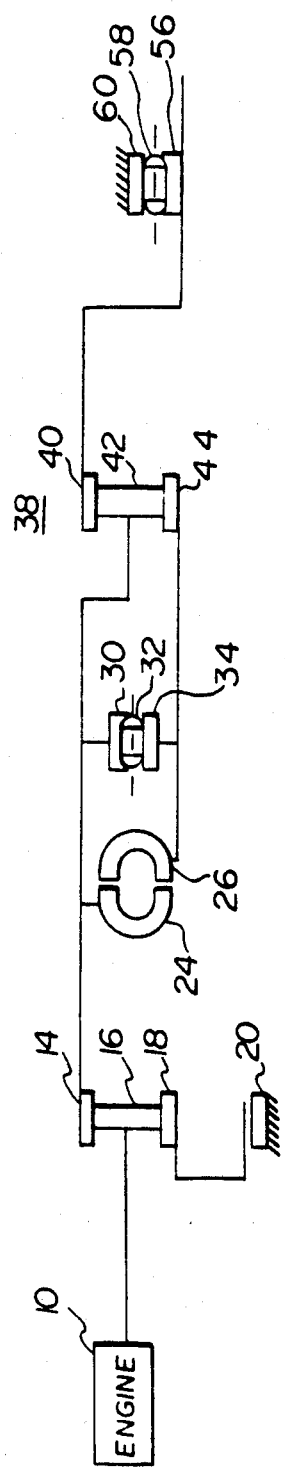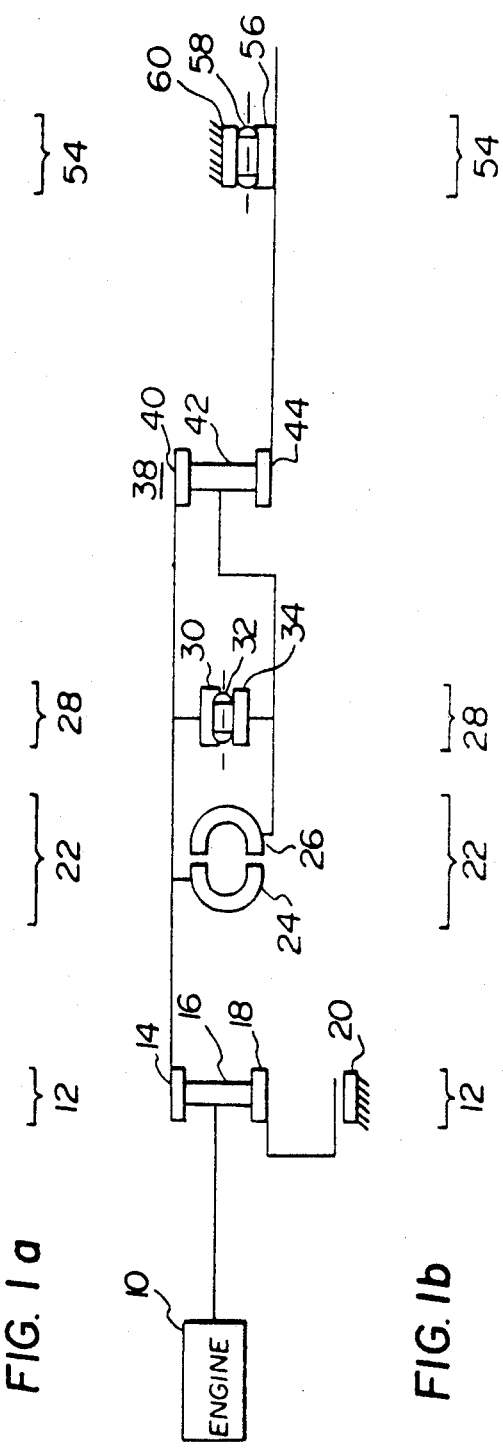
FIG. 1a
FIG. 1b

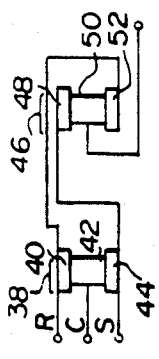
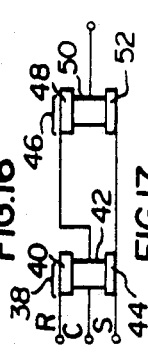
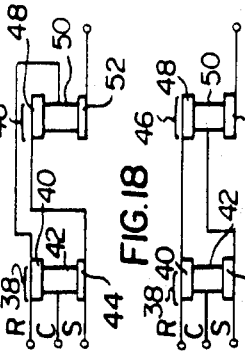
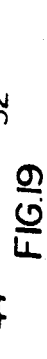
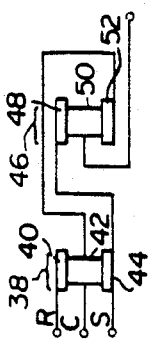
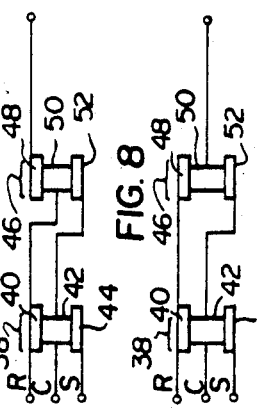
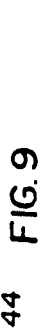
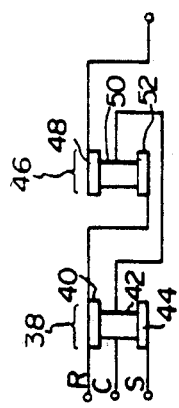

METHOD AND APPARATUS FOR POWER TRANSMISSION FROM AN ENGINE

This application is a continuation-in-part of application Ser. No. 361,359, filed Mar. 24, 1982, now U.S. Pat. No. 4,579,019, which is a continuation-in-part of application Ser. No. 137,428, filed Apr. 4, 1980, now abandoned.

BACKGROUND OF THE INVENTION

The present invention relates to an apparatus for transmitting power from an engine which is especially adapted for use in motor vehicles but is applicable wherever engines are to be applied to a variable load or to a load which is to be subjected to acceleration.

In many applications, such as in the operation of automobiles, a high torque must be available for starting and accelerating the vehicle from a standstill or in coping with heavy loads, while at higher velocities, a correspondingly lower torque is acceptable. Traditional automatic transmissions employ a fixed number of discrete gear ratios between the engine output and the transmission output in order to cover the range of gear ratios corresponding to a minimum velocity (or maximum gearing down) up to a maximum operating velocity. Moreover, changing from one gear ratio to another requires mechanical switching of gears. Generally, conventional automatic transmissions depend on significant slippage in a torque converter to cope with zero load velocity. Such slippage is energy wasteful and results in significant inefficiency. By being limited for practical purposes to gear ratios of about 4 to 1 or 5 to 1 in low gear, relatively large engines are required to deal with acceleration requirements from standstill. Such engine capacity is greater than that required for normal operating speeds and results in a correspondingly higher fuel consumption than would be used by an engine with smaller capacity.

One transmission designed to automatically adjust itself to the changes in torque requirements from the load is that disclosed in U.S. Pat. No. 1,203,265, granted to C. R. Radcliffe on Oct. 31, 1916, which employs a torque converter followed by a planetary gear set. The turbine output of the torque converter drives the ring gear of the planetary gear set and the engine crankshaft drives both the propeller of the torque converter and the sun gear of the planetary gear set. The driven output follower member is the planetary gear cage. In the latter device, the reaction of an increased load causes the turbine wheel to slow done with the result that by virtue of the planetary action of the gears, an increase in torque is applied to the driven member. This change in torque occurs continously and automatically, depending only on the relative velocities of the turbine wheel and drive shaft. However, the turbine wheel in the Radcliffe device reverses its direction for a significant portion of its operation resulting in attendant heat build-up and hence energy waste. Moreover, a relatively large change in turbine wheel velocity to drive shaft velocity produces a significantly smaller relative change in output follower member velocity to turbine wheel velocity.

SUMMARY OF THE INVENTION

According to the invention there is provided for use with a first discrete source of rotary power having a first output coupling means and a second discrete source of rotary power having a second output coupling means, a planetary gear assembly having a ring gear, a sun gear, and a planetary carrier cage. The assembly is comprised of a primary driving member and a secondary driving member with the primary driving member for coupling by the first output coupling means to the first discrete source of rotary power. The second driving member is for coupling by the second output coupling means to the second discrete source of rotary power. Also included is a driven follower member which is a member of the planetary gear assembly other than the planetary carrier cage.

By limiting rotation of the driven follower member in one direction only, unwanted reversal of the mode of operation of the planetary gear assembly may be avoided.

Advantageously, at least one of the first and second discrete sources of rotary power is obtained from an engine source coupling means for coupling to an engine source of rotary power. By employing an engine source planetary gear assembly for the engine source coupling means having an input member for direct coupling to an engine source of rotary power, a locking member releasably locked in a fixed position and an output member directly coupled to a rotary member which defines one of the first and second discrete sources of rotary power, one can easily arrange to decouple the associated source of rotary power from the associated driving member or members during start-up and, within reasonable limits, obtain any desired gain in rotary speed.

A fluid coupling means may be utilized as one of the first and second coupling means. The fluid coupling means includes a fluid coupling having an impeller wheel input member for coupling to the associated discrete source of rotary power, and a turbine wheel for coupling to that driving member of the planetary gear assembly whose speed of rotation is lowest when the speed of rotation of the driven follower member is zero, and the other of the first and second coupling means is non-fluid coupled means for non-slip coupling to the associated discrete source of rotary power thereto.

In another aspect of the invention there is provided for use with a discrete source of rotary power having a first output coupling means and a second discrete source of rotary power having a second output coupling means, the combination of a pair of tandem-connected planetary gear assemblies with each assembly having a ring gear, a sun gear and a planetary carrier cage. Each assembly comprises a primary driving member and a secondary driving member with the primary driving member of the first assembly for coupling by the first coupling means to the first discrete source of rotary power, and the secondary driving members of both assemblies for coupling by means of the second coupling means to the second discrete source of rotary power. Each assembly further includes a driven follower member with that of the first assembly coupled to the primary driving member of the second assembly. When the driven follower member of the second assembly is a planetary carrier cage, then the primary and secondary driving members of the first assembly, in combination, are other than a combination of the ring gear and sun gear. When the driven follower member of the second assembly is the planetary carrier cage and the ring gear and the sun gear of the first assembly, in combination, are a combination of the secondary driving and driven follower members of the first assembly, then the primary and secondary inputs to the first assembly, in combination, are other than a combination of the planetary carrier cage and sun gear, and other than a pair of tandem-connected assemblies in which the planetary carrier cage of the first assembly is coupled to that of the second assembly and the ring gear of the first assembly is coupled to the sun gear of the second assembly. The driven follower member of the second assembly is constrained to rotate in only one direction.

At least one of the first and second discrete sources of rotary power can be obtained from an engine source coupling means for coupling to an engine source of rotary power.

Preferably one may utilize for one of the first and second coupling means a fluid coupled means including a fluid coupling having an impeller wheel input member for coupling to the associated discrete source of rotary power, and a turbine wheel for coupling to that driving member of the first planetary gear assembly whose speed of rotation is lowest when the speed of rotation of the driven follower member of the second planetary gear assembly is zero. For the other of the first and second coupling means a non-fluid coupled means for non-slip coupling of the associated discrete source of rotary power thereto may be used. By coupling to the sources of power in this way, increased torque requirements due to increased loads cause a reduced angular velocity of the fluid coupled driving member relative to the non-fluid coupled one and by virtue of the planetary action of the gears, causes a resultant reduced velocity and increased torque of the following member (or output member) of the second assembly. Increased torque requirements due to increased acceleration demands are met by an increased velocity of the non-fluid coupled driving members of the first assembly relative to the other driving member causing increased torque on the output member without an immediate increase in the output member angular velocity.

Use of a fluid coupling having a constant torque (torque on the impeller shaft equal to torque on the turbine shaft) rather than one operating as a torque converter enables the achievement of over 95% efficiency and a turbine wheel speed of rotation equal to about 97% of the impeller wheel speed of rotation. The latter result allows simplification of design in avoiding the need to step up by a constant factor the impeller wheel speed by speed increasing gears so that the turbine wheel speed is in the correct operating range. Torque converters however can, by utilizing variable vane stators and a one-way clutch, achieve about 95% efficiency and operate as a constant torque fluid coupling when the turbine wheel speed approaches that of the impeller wheel. The one-way clutch may be a conventional free wheeler of the grip roller type.

The first and second discrete sources of rotary power may, as an additional aspect of the invention, comprise first and second motors having respective first and second drive shafts. The absolute speeds of the motors and the speed of one of the motors relative to the other in this aspect are controlled by drive shaft velocity control means coupled to the motors. Translation gears are affixed to the drive shafts for translating rotary power motion therefrom to rotary motion of respective coaxial shafts coupled to respective primary and secondary driving members of the tandem-connected planetary gear assemblies. With such an arrangement no reactive components such as fluid couplings need to be incorporated to cause variation in the speed of rotation of one driving member of the first planetary gear assembly relative to the other in response to either load changes or a speed change of an engine source of rotary power when both first and second discrete sources of rotary power are obtained from the latter.

By employing electric motors for the first and second motors one may, through controlling the electric power applied to the motors by drive shaft velocity control means, independently vary the respective speeds of rotation of the two driving members of the first planetary gear assembly. It is even possible to use motors which can be reversed and hence operate for any arrangement of tandem-connected assemblies either in a forward or a reverse mode. The first and second coupling means in such a case is extremely simple, consisting of only speed adjusting and translation gears.

As a further aspect of the invention there is provided the combination of an engine and a planetary gear transmission comprising an engine having a rotary output shaft, an engine neutralizing planetary gear assembly having an input member for direct coupling to the rotary output shaft, a locking member releasably lockable in a fixed position, and an output member, a fluid coupled assembly having an impeller wheel directly coupled to the output member of the engine neutralizing planetary gear assembly and a turbine wheel, and a pair of tandem-connected planetary gear assemblies. Each assembly of the pair of tandem-connected planetary gear assemblies has a primary driving member, a secondary driving member and a driven follower member. The secondary driving members are directly coupled together and the driven follower member of the first assembly is directly coupled to the primary driving member of the second assembly. When the driven follower member of the second assembly is the planetary carrier cage, then the primary and secondary driving members of the first assembly, in combination, are other than a combination of the ring gear and sun gear. When the driven follower member of the second assembly is the planetary carrier cage and the ring gear and sun gear of the first assembly, in combination, are a combination of the secondary driving and driven follower members of the first assembly, then the primary and secondary inputs to the first assembly, in combination, are other than a combination of the planetary carrier cage and sun gear, and other than a pair of tandem-connected assemblies in which the planetary carrier cage of the first assembly is coupled to that of the second assembly and the ring gear of the first assembly is coupled to the sun gear of the second assembly. The driving member of the primary and secondary driving members of the first assembly having the lowest speed of rotation when the speed of rotation of the driven follower member of the second assembly is zero is coupled to the turbine wheel, and the other of the primary and secondary driving members of the first assembly is non-slippably coupled to the output member of the engine neutralizing planetary gear assembly.

Incorporating a one-way clutch between the turbine wheel and impeller wheel of the fluid coupling to prevent the turbine wheel from rotating faster than the impeller wheel ensures that the engine acts as a brake on the load when the load is self-accelerating. Such acceleration may occur, for example, when the engine and transmission are employed in an automobile and the latter is travelling downhill.

Incorporating a one-way clutch to constrain the driven follower member of the second planetary gear assembly to rotation in only one direction, namely the direction of rotation of the driving members of the first planetary gear assembly, ensures that the driven follower member will not go into accidental reverse such as may occur, for example, on start-up. Of course, for particular configurations of tandem-connected planetary gear assemblies, it is possible to employ a reverse mode of operation wherein the driven follower of the second planetary gear set rotates in a direction opposite to that of the driving members of the first assembly, in which case the one-way clutch would constrain the driven follower member to rotation in only a direction reverse to that of the driving members of the first assembly.

Preferably the primary driving, secondary driving and driven follower members of the tandem-connected planetary gear assemblies are the planetary carrier cage, ring gear and sun gear, respectively.

By including a pair of speed adjusting gears in the coupling of one of the primary and secondary driving members of the first planetary gear assembly to the output member of the engine neutralizing planetary gear assembly, in order to set the speed of rotation of that driving member of the first planetary gear assembly coupled to the turbine wheel to be a preselected amount greater than that of the other driving member of the first planetary gear assembly when there is a maximum coupling between the impeller wheel and turbine wheel of the fluid coupling, a preselected amount of overdrive may be obtained. The foregoing speed adjustment can be accomplished either by incorporating speed enhancing gears in the coupling means of the first and second coupling means containing the fluid coupling or speed reducing gears in the other of the first and second coupling means.

The automatic transmission may have the primary driving, secondary driving and driven follower members coupled to the planetary carrier cage, ring and sun gears, respectively, of the first and second planetary gear sets. Such an arrangement produces an output which is extremely sensitive to changes in the relative input velocities and which can produce a zero output angular velocity with only a small change in either the velocity of the primary driving member with respect to the velocity of the secondary driving member of the first gear set or vice versa.

The foregoing automatic transmission provides continuous adjustment of the torque to suit load acceleration requirements and because of the large gear down available makes it possible to use smaller engines that are currently impractical for use with conventional automatic transmissions.

SUMMARY OF THE DRAWINGS

FIG. 1a is a detailed schematic illustration of an automatic transmission according to FIG. 1 but with a single planetary gear assembly substituted for the tandem-connected planetary gear assemblies of FIG. 1.

FIG. 1b is a detailed schematic illustration of an automatic transmission similar to FIG. 1a except having an alternative configuration for connecting the single planetary gear assembly.

FIGS. 5 to 19 illustrate in schematic form fifteen different possible arrangements of the planetary gear sets of the automatic transmission.

DETAILED DESCRIPTION WITH REFERENCE TO THE DRAWINGS

Figure 1:
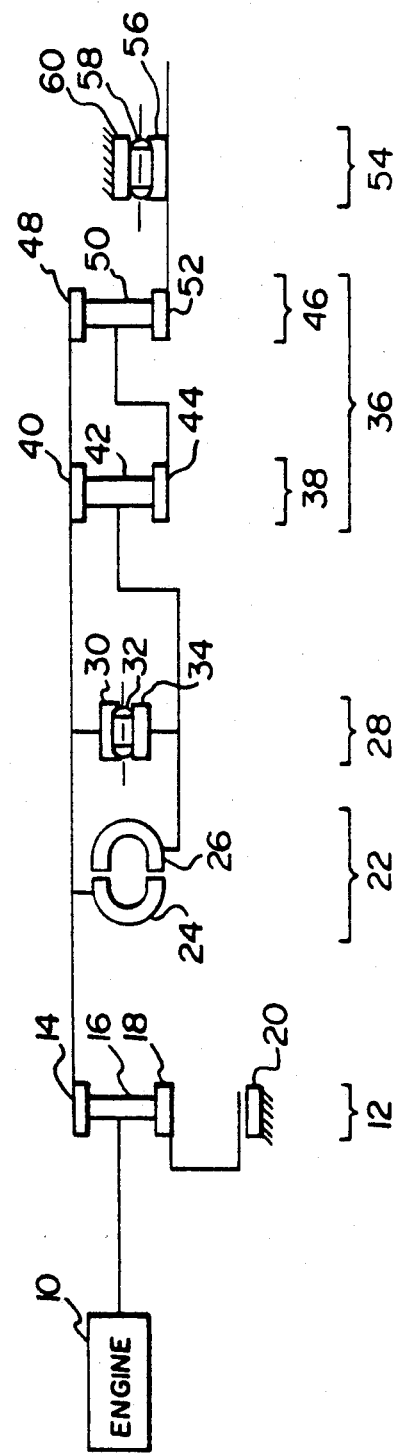
FIG. 1 is a detailed schematic illustration of an automatic transmission according to the invention.

In the drawings, like reference numbers in the different figures indicate like components.

The apparatus illustrated schematically in FIG. 1 consists of an engine source planetary gear assembly 12 having a planetary carrier cage 16 coupled directly to an engine 10. A sun gear 18 of the planetary gear assembly 12 is releasably lockable in a fixed position by a neutral brake band 20 and a ring gear 14 is coupled to an impeller wheel 24 of a fluid coupling 22. The impeller wheel 24 drives a turbine wheel 26 of the fluid coupling 22, rotation of which is constrained, by application of a one-way clutch or freewheel 28, to angular velocities less than that of the impeller wheel 24, thereby preventing the turbine wheel 26 from outrunning the impeller wheel 24. This constraint is achieved by connecting an inner element 30 of the one-way clutch 28 to the impeller wheel 24 and an outer element 34 to the turbine wheel 26. A roller 32 of the one-way clutch 28 allows free wheeling of the outer element 34 relative to the inner element 30 while establishing a mechanical connection between the impeller wheel 24 and turbine wheel 26 when the speed of rotation of the latter exceeds that of the former. The turbine wheel 26 thus constrained is coupled to the planetary carrier cage 42 of a first planetary gear assembly 38 while the ring gear 14 of the engine source assembly 12 is coupled to a ring gear 40 of the first assembly 38 and a ring gear 48 of a second assembly 46 of a tandem-connected pair of planetary gear assemblies 36. A sun gear driven follower member 44 of the first planetary gear assembly 38 is directly coupled to the planetary carrier cage 50 of the second planetary gear assembly 46. Sun gear driven follower member 52 of the second planetary gear assembly 46 is coupled by means of a second one-way clutch or freewheel 54 to the transmission casing (not shown). An inner element 60 of the one-way clutch 54 is fixed to the transmission casing and rollers 58 permit an outer element 56 to rotate in only one direction, that direction being the direction of rotation of the sun gear 44 and carrier cage 42 of the first assembly 38. Both one-way clutches or freewheels 28 and 54 are conventional freewheels with rollers and locking mechanisms as are well-known in the industry.

FIGS. 1a and 1b depict an arrangement identical to that of FIG. 1 except that the tandem-connected planetary gear assemblies 36 of FIG. 1 are replaced by single planetary gear assemblies 38 in FIGS. 1a and 1b. The configuration of the planetary gear assembly 38 appearing in both FIGS. 1a and 1b would not be operative if the output member were the planetary carrier cage 42 and the two input members were the ring gear 40 and the sun gear 44 inasmuch as in order to drive the output member angular velocity to zero a reversal in the direction of rotation of one of the input members would be required. Even without the constraint on the direction of rotation imposed by the second one-way clutch 54 and the first one-way clutch 28 such a reversal in the direction of rotation of the turbine wheel 26 of the fluid coupling 22 would result in unacceptably large reductions in efficiency through heat generation.

Figure 2:
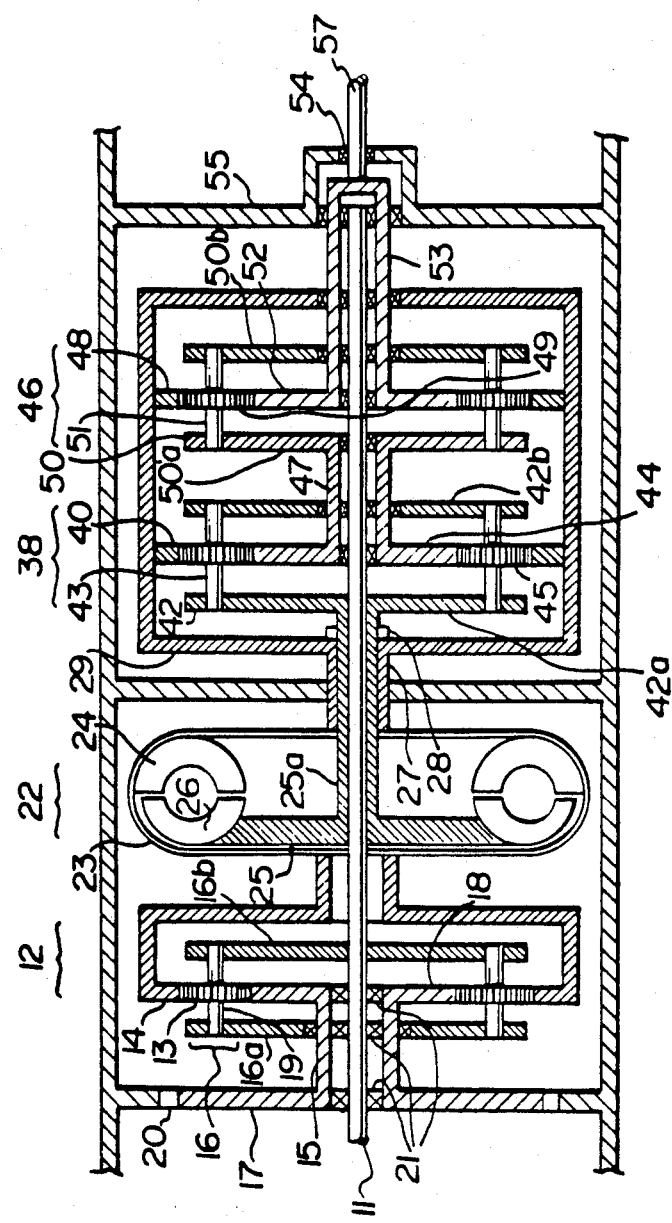
FIG. 2 is an elevation view in section of an automatic transmission according to the illustration of FIG. 1.

An automatic transmission according to the schematic illustration shown in FIG. 1 is seen in FIG. 2 partly in section. An input member or shaft 11 is operably connected to and driven by an engine output member (not shown). Securely fastened to the input shaft 11 is one disk 16b of a pair of disks 16a and 16b of a planetary carrier cage 16. Journaled to the two disks 16a and 16b of the planetary carrier cage 16 are a plurality of planetary pinion axle shafts 19. Planetary pinion gears 13 are securely fastened to the planetary pinion axle shafts 19. Meshing with the teeth of the pinion gears 13 are the teeth of a sun gear 18 which is releasably lockable in a fixed position by a neutral brake band 20 affixed to the transmission casing 55 such as is commonly used in automatic transmissions. Sun gear 18 when unlocked rotates about the input shaft 11 on bearings 21. Also meshing with the teeth of the planetary gears 13 are the teeth of a ring gear 14, the latter being rotatable about the input shaft 11 and affixed to the impeller housing 23 of a constant torque fluid coupling 22. Securely attached to the impeller housing 23 are a plurality of impeller blades 24, together comprising an impeller wheel and which rotate with the impeller housing 23 in response to the rotation of the ring gear 14. Opposed to the impeller blades 24 are a plurality of turbine blades 26 affixed to a turbine disk 25 and hollow shaft 25a, together comprising a turbine wheel and which is freely rotatable about the input shaft 11.

The hollow shaft 25a securely connects to one disk 42a of a pair of disks 42a and 42b of the planetary carrier cage 42 of a first planetary gear set 38. A ring gear carrier member 29 is coupled to the impeller housing 23 by means of a securely fastened hollow shaft 27. A one-way clutch or freewheel 28 prevents the turbine wheel from rotating faster than the hollow shaft 27 affixed to the impeller housing 28, thereby preventing the transmission from going into overdrive due to free running of the load (not shown). The ring gear carrier member 29 has affixed ring gears 40 and 48 of the first and second planetary gear assemblies 38 and 46, respectively. Journaled into either end of the planetary carrier cage end plates 42a and 42b are a plurality of planetary pinion axle shafts 43 and a plurality of planetary pinion gears 45 are securely fastened to respective planetary pinion axle shafts 43. The teeth of the planetary pinion gears 45 mesh with those of a sun gear 44, the latter being coupled by a hollow shaft 47 to one disk 50a of a pair of disks 50a and 50b of the planetary carrier cage 50 of the second planetary gear set 46. The teeth of planetary pinion gears 45 also mesh with the teeth of the ring gear 40. Journaled to the two disks 50a and 50b forming the planetary carrier cage 50 are a plurality of planetary pinion axle shafts 51 to each which is securely fastened a planetary pinion gear 49. The teeth of the latter gears 49 mesh with the teeth of the ring gear 48 of the second planetary gear set 46 as well as those of a sun gear driven follower member 52 of the second planetary gear set 46. The sun gear 52 is coupled by means of a hollow shaft 53 to the output shaft 57 of the transmission. A one-way clutch 54 mounted between the transmission casing 55 and the output shaft 57 constrains rotation of the latter to one direction only. The output shaft 57 is coupled to additional gear arrangements for "park" and "reverse" as well as to speedometer gearing and, subsequently, the output load (all of the latter not being shown).

Still referring to FIG. 2, in operation the engine output member (not shown) drives the input member 11 causing the latter to rotate. Rotation of the input member or shaft 11 causes the planetary carrier cage 16 to rotate at the same rate and direction as the input shaft 11. Initially the neutral brake band 20 is disengaged leaving the sun gear 18 to rotate freely in order to minimize start-up load. Once the engine (not shown) is started, the neutral brake band 20 is applied locking the sun gear 18 into a fixed position. The planetary pinion gears 13 then drive the ring gear 14, impeller housing 23 and impeller blades 24 at an angular velocity equal to $(1+N_S/N_R)$ times the speed of rotation of the input shaft 11, where $N_R$ and $N_S$ are the number of teeth in the ring gear 14 and sun gear 18, respectively. Rotation of the impeller blades 24 attached to the impeller housing 23 causes oil contained in the fluid coupling 22 to be flung outwardly by the impeller blades 24 and forced between the blades 26 of the turbine where it is deflected and flung back into the impeller blades 24. The circulating oil drives the turbine blades 26 round at an increasing speed until it is rotating at substantially the same speed as the impeller housing 23. The torque transmitted by the fluid coupling 22 is substantially that developed by the engine except for minor losses due to "slip" which become significant at low speeds. Rotation of the turbine blades 26 causes the turbine disk 25 and planetary carrier cage 42 of the first planetary carrier gear assembly 38 to rotate. The ring gear carrier member 29 is driven by the hollow shaft 27 connected to the impeller housing 23 causing both ring gears 40 and 48 to rotate at the angular velocity of the impeller blades 24. The sun gear 44, which is the driven follower member of the first planetary gear assembly 38, drives the planetary carrier cage 50 of the second planetary gear set 46 at an angular velocity $n_{S1}$ given by $$n_{S1} = -(N_{R1}/N_{S1})n_R + (1 - N_{R1}/N_{S1})n_A \qquad (1)$$

where $N_{R1}$ and $N_{S1}$ are the number of teeth on the ring gear 40 and sun gear 44, respectively of the first planetary gear set 38 and $n_R$ and $n_A$ are the angular velocities of the latter mentioned ring gear 40 and planetary carrier cage 42, respectively. As a result of the ring gear 40 and planetary carrier cage 42 driving the second planetary gear assembly 46, the sun gear 52 of the latter rotates at an angular velocity $n_{S2}$ given by $$n_{S2} = -(N_{R2}/N_{S2} + (1+N_{R2}/N_{S2})N_{R1}/N_{S1})n_R + (-1 + N_{R2}/N_{S2})(1 + N_{R1}/N_{S1})n_A \qquad (2)$$

where $N_{R2}$ and $N_{S2}$ are the number of teeth on the ring gear 48 and sun gear 52, respectively, of the second planetary gear assembly 46. It can be seen that coefficients of $n_R$ and $n_A$ in the formula for $n_{S2}$ will be significantly greater than those for $n_{S1}$ for the values for $N_{S1}$, $N_{R2}$, and $N_{S2}$ generally employed. For example, if $N_{R1} = N_{R2} = 42$ and $N_{S2} = 18$, then $$n_{S1} = -7/3 \, n_R + 10/3 \, n_A, \text{ and} \qquad (3)$$

$$N_{S2} = -91/9 \, n_R + 100/9 \, n_A \qquad (4)$$

Relatively small changes in $n_R$ relative to $n_A$ for values of $n_R$ slightly greater than $n_A$ will result in large changes in $n_{S2}$ where $N_{R2}$ and $N_{S2}$ are the number of teeth on the ring gear 48 and sun gear 52, respectively, of the second planetary gear assembly 46. This effect occurs because the coefficients of $n_R$ and $n_A$ in the formula for $n_{S2}$ are significantly greater than those for $n_{S1}$ for the values of $N_{S1}$, $n_{R2}$, $N_{S1}$ and $N_{S2}$ generally employed.

Rotation of the sun gear 52 of the second planetary gear assembly 46 drives the hollow shaft 53 coupled to the output shaft 57. The one-way clutch 54 prevents the output shaft 57 from undesirably reversing its direction of rotation. During initial acceleration, the turbine blades 26, for the ratio of the number of teeth of the gears of the planetary gear assembly indicated above will quickly reach 0.91 of the velocity of the input shaft 11 at which point the velocity of the output shaft 57 will still be zero. As the velocity of the turbine blades 26 increases beyond 0.91 of the velocity of the input shaft 11, the output shaft 57 will begin rotating. For each incremental change in engine speed caused by depressing the engine accelerator (not shown), the turbine blade velocity $n_A$ will increase relative to the impeller housing velocity $n_R$. The latter increase will result in an increase in $n_{S2}$, as can be seen from equation (4) above, until maximum coupling between the turbine blades 26 and impeller blades 24 is obtained.

In cases where there is a free running load such as when a vehicle is travelling downhill, the one-way clutch 54 will prevent the turbine blades 26 from outrunning the impeller wheel 24 and thereby cause the engine to act as a brake on the load (not shown). Once a final operating velocity of the output shaft 57 is achieved, any sudden increase in load will be reflected back to the second and first planetary gear assemblies 46 and 38, respectively, causing the turbine blade velocity $n_A$ to be reduced both absolutely and relative to the impeller blade or ring gear angular velocity $n_R$ thus accommodating a reduced velocity $n_{S2}$ of the sun gear 52 of the second planetary gear assembly 46. Thus, increase in load causes a gearing down effect and hence an increase in output torque of the transmission.

The transmission also continuously and automatically adjusts in response to a demand for increased acceleration prompted by an increase in velocity of the input shaft 11. In the latter case both the velocity $n_R$ of the impeller blades 24 and the velocity and $n_A$ of the turbine blades 26 will tend to increase but the output velocity $n_{S2}$ will initially remain the same. An increase in torque arises by virtue of the greater gearing down of velocity present at the input of the first planetary gear assembly 38 (the gearing down ratio of the transmission equals engine output speed divided by transmission output speed $n_{S2}$). The resulting increased output torque applied to the output shaft 57 imparts an angular acceleration to the latter (torque=moment of inertia×angular acceleration) and hence an acceleration to the load which is either linear or angular depending on the nature of the load. The adjustment of the transmission to variations in output load or to variations in input engine speed occurs continuously and automatically.

Figure 3:
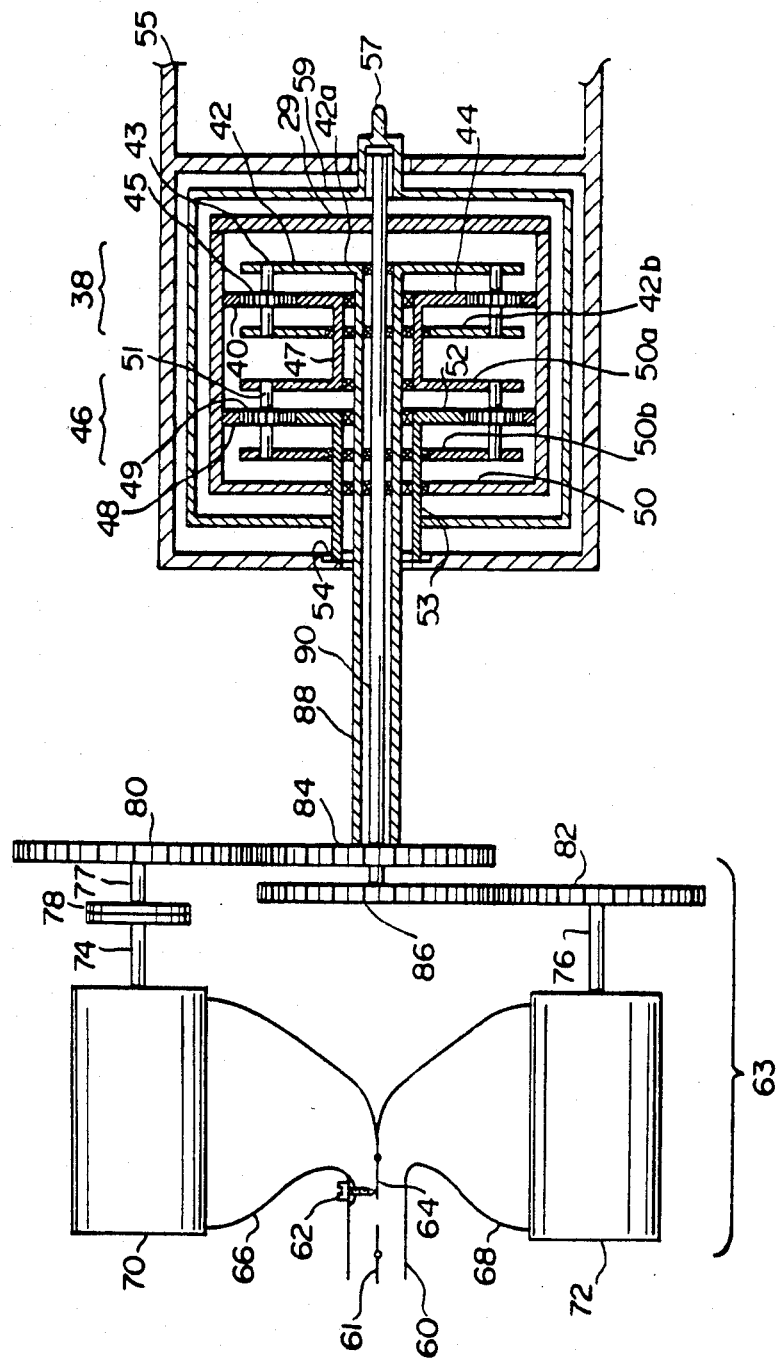
FIG. 3 is an elevation view partly in section of a dual motor arrangement utilizing internal combustion engines.

A dual motor driven embodiment of the invention utilizing a pair of internal combustion engines is illustrated in the diagram of FIG. 3. Here the two motors 70 and 72 are internal combustion engines powered by fuel which is delivered to manifolds 66 and 68 corresponding to the two engines 70 and 72, respectively. The overall fuel demand is set by a carburetor 60 having a throttle valve 61 and an air-fuel diversion valve 64. The latter valve 64 is adjusted by a calibration screw 62 which sets the relative amount of fuel delivered to each of the two manifolds 66 and 68. The output shaft 74 from the motor 70 is coupled to one plate of a clutch 78. The other plate of the latter clutch 78 is secured to a clutch shaft 77 rigidly fastened to a gear 80. The teeth of the gear 80 mesh with those of gear 84 which drives a hollow shaft 88. The output shaft 76 from the motor 72 drives a gear 82 whose teeth mesh with those of a second gear 86 coupled to an input shaft 90 which is coaxially contained within the hollow shaft 88. The coaxial shaft 88 drives one disk 42a of a pair of disks 42a and 42b of a planetary carrier cage 42 of a first planetary gear assembly 38. The solid shaft 90 drives a ring gear carrier 29 to which are affixed ring gears 40 and 48 corresponding to the first and second planetary gear assemblies 38 and 46, respectively. Journaled to the two disks 42a and 42b forming the planetary carrier cage 42 near their circumferential ends are a plurality of spaced planetary pinion axle shafts 43 to each of which is rigidly secured a planetary pinion gear 45. A plaetary pinion gear 45 of the first gear assembly 38 meshes both with the ring gear 40 and with the sun gear 44 of the first gear assembly. The latter sun gear 44 is coupled to the first disk 50a of a pair of disks 50a and 50b of a planetary carrier cage 50 of the second gear assembly 46. Journaled to the two disks 50a and 50b forming the latter planetary carrier cage 50 near their outer peripheries are a plurality of spaced apart planetary pinion axle shafts 51 to each of which are secured a pinion gear 49. The teeth of the latter pinion gears 49 mesh with the teeth of ring gear 48 and with those of sun gear 52 of the second gear set 46. The sun gear 52 is coupled by means of a hollow shaft 53 and an attached output arm 59 to the output shaft 57. The hollow shaft 53 also is coupled to a one-way clutch 54 mounted in the transmission casing 55.

In operation the clutch 78 is released disconnecting drive shaft 74 from clutch shaft 77 and allowing the motor 70 to start without a load. Once the motor 70 has started, the clutch 78 connects the motor drive shaft 74 to the clutch shaft 77. Applying the vehicle brake (not shown) causes rotation through the planetary gear sets 38 and 46 of shaft 90, and hence, rotation of drive shaft 76 coupled by gears 82 and 86 to the shaft 90. Ignition of the motor 72 will then result in its start-up. With both motors 70 and 72 in operation and coupled to the input shafts 88 and 90, respectively, the operation of the first and second planetary gear assemblies 38 and 46 is identical to that of the previous transmission embodiments discussed. In the transmission of FIG. 3, however, control of the relative speeds of the two input shafts 88 and 90 is obtained by controlling the relative amount of fuel entering manifolds 66 and 68 by adjusting the fuel diversion valve 64. Thus, a fixed setting of the air-fuel diversion valve 64 will result in a fixed effective gear ratio being applied to output shaft 57.

Figure 4:
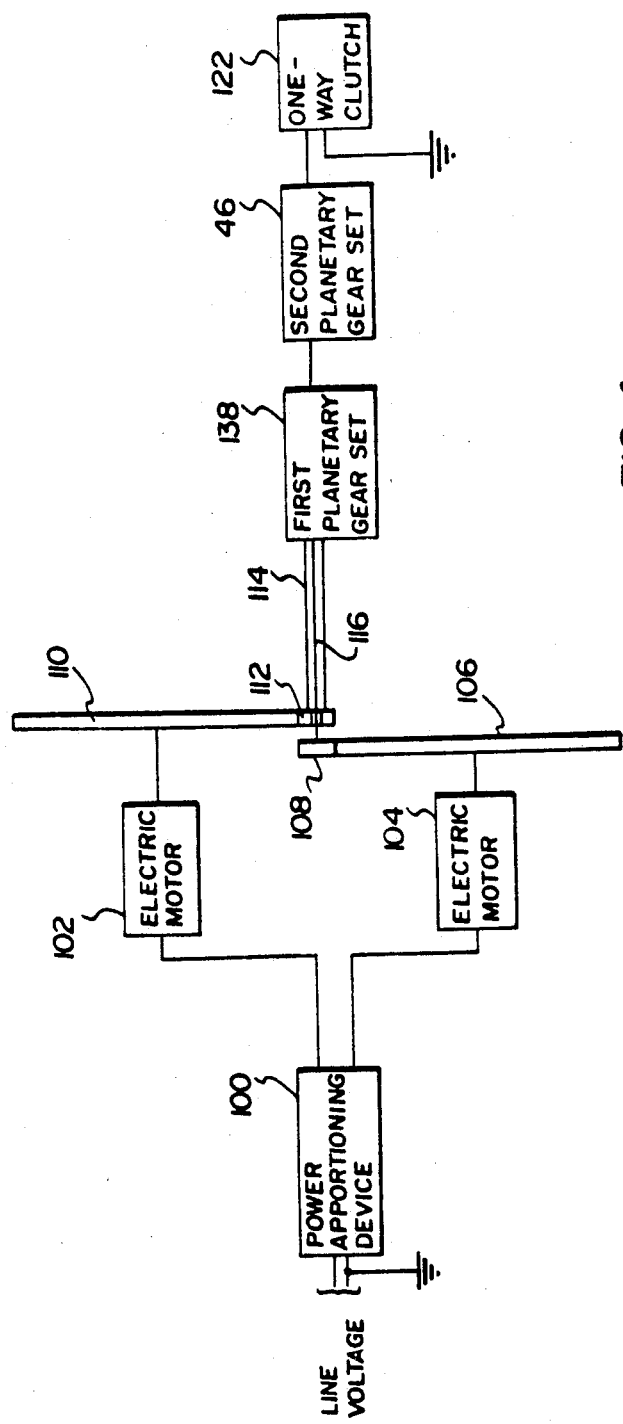
FIG. 4 is a block diagram representation of a dual motor arrangement utilizing electric motors.

An alternative embodiment to that of FIG. 3 is seen in FIG. 4. The embodiment of FIG. 4 utilizes electric power and features a pair of electric motors 102 and 104 driven by a power apportioning device 100, the power apportioning device 100 receiving line voltage which it distributes to motors 102 and 104. The electric motor 102 drives a gear 110 whose teeth mesh with those of a gear 112, the latter driving a hollow shaft 114. The electric motor 104 drives a gear 106 whose teeth mesh with those of a gear 108 rigidly affixed to shaft 116. The hollow shaft 114 couples to the primary input and the solid shaft 116 couples to the secondary input of the first planetary gear assembly 138. The secondary input of the first planetary gear assembly 138 is directly coupled to the secondary input of the second planetary gear assembly 46. The driven output follower from the first planetary gear assembly is directly coupled to the primary input of the second planetary gear assembly 46. The output from the second planetary gear assembly 46 couples to the input of a one-way clutch 122. The other input of the one-way clutch 122 couples to the transmission casing (not shown). The output of the one-way clutch 122 is coupled to a load (also not shown).

The operation of the embodiment of FIG. 4 is similar to that of FIG. 3 except that the electric motors 102 and 104 are driven by the power supplied by the power apportioning device 100 which sets the absolute speeds of each of the motors 102 and 104. Moreover, in view of the absence of any ignition requirement of the electric motors, there is no clutch at the output of either of the electric motors 102 and 104 as appears in the output of the motor 70 of FIG. 3. The operation of embodiment of FIG. 4 is otherwise identical to that as described for FIG. 3.

FIGS. 5 to 19 illustrate fifteen different configurations of connecting a pair of planetary gear sets tandem. In each of the Figures, like reference numbers indicate like parts so that, for example, the first planetary gear assembly 38 of FIG. 5 is labelled with the same reference number as the first planetary gear assemblies of FIGS. 6 to 19. In FIG. 5 the three possible inputs R, C and S of the first planetary gear set 38 correspond to inputs which drive the ring gear 40, the planetary carrier cage 42 and the sun gear 44, respectively. The ring gear 40 of the first planetary gear assembly is coupled to the sun gear 52 of the second planetary gear assembly and the planetary carrier cage 42 of the first gear assembly 38 is coupled to the carrier cage 50 of the second gear set 46. The output is taken from the ring gear 48 of the second gear assembly 46.

The interconnections of the planetary gear assemblies for FIGS. 6 to 19 in light of the discussion of the interconnections of the gear sets illustrated in FIG. 5 is self evident. It is also obvious that there are three possible combinations of the three inputs R, C and S, one of which corresponds to the inputs being applied directly to the second assembly, bypassing the first. Table 5 below illustrates the output speed from the configuration of FIG. 5 for the ratio of the number of teeth of the ring gear $N_R$, planetary gears $N_A$ and sun gear $N_S$ of $N_R:N_A:N_S=42:18:12$ and for each of these inputs where, for example, a combination of C and R, with C as the primary input and R as the secondary input, is denoted by C/R. Output speeds are given as a function of primary and secondary speeds, with all speeds being on a relative basis. Output speeds for the same ratios of gear teeth as in Table 5 for the same combination of inputs corresponding to FIGS. 6 to 19 are given in Tables 6 to 19, respectively.

Tables 6 to 19, similar to Table 5, for the configurations of FIGS. 6 to 19 are also shown below.

In Tables 5 to 19 inclusive, in addition to tabulations of output speeds for a given selection of the three possible inputs R, C and S as primary input and secondary input there are also recorded output speeds for values of the primary and secondary inputs listed being interchanged. For example, in Table 5, when the planetary carrier cage, C, of the first assembly 38 is the secondary input and the sun gear, S, is the primary input, values with the secondary input fixed at 10 and the primary ranging from −45 to 20 are given in the second column headed S/C. With the primary fixed at 10 and the secondary ranging from −45 to 20 values of the output are listed in the first column headed (S/C)r.

Figure 21:
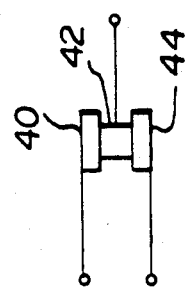
FIGS. 20a, 20b and 21 illustrate in schematic form three different possible arrangements of a single gear assembly.
Figure 20:
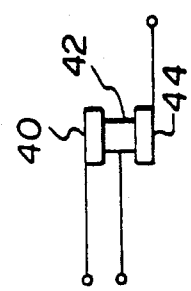
Figure 20:
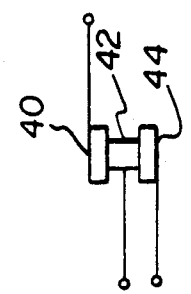

FIGS. 20a, 20b and 21 illustrate three different configurations for connecting a single planetary gear set. Table 20 gives output values for FIGS. 20a and 20b while Table 21 gives output values for FIG. 21.

TABLE 5

| Input | | FIG. 5 Output | | | |
|---|---|---|---|---|---|
| Primary | Sec. | (S/C)r | S/C | S/R | (S/R) |
| 20 | 10 | 18.2 | 11.8 | 14.3 | 15.7 |
| 15 | 10 | 14.1 | 10.9 | 12.1 | 12.9 |
| 14 | 10 | 13.3 | 10.7 | 11.7 | 12.3 |
| 13 | 10 | 12.4 | 10.6 | 11.3 | 11.7 |
| 12 | 10 | 11.6 | 10.4 | 10.9 | 11.1 |
| 11 | 10 | 10.8 | 10.2 | 10.4 | 10.6 |
| 10 | 10 | 10 | 10 | 10 | 10 |
| 9 | 10 | 9.2 | 9.8 | 9.6 | 9.4 |
| 8 | 10 | 8.4 | 9.6 | 9.1 | 8.9 |
| 7 | 10 | 7.6 | 9.4 | 8.7 | 8.3 |
| 6 | 10 | 6.7 | 9.3 | 8.3 | 7.7 |
| 5 | 10 | 5.9 | 9.1 | 7.9 | 7.1 |
| 0 | 10 | 1.8 | 8.2 | 5.7 | 4.3 |
| −3 | 10 | −.6 | 7.6 | 4.4 | 2.6 |
| −8 | 10 | −4.7 | 6.7 | 2.3 | −.3 |
| −15 | 10 | −10.4 | 5.4 | −.7 | −4.3 |
| −45 | 10 | −34.9 | 0.1 | −13.6 | −21.4 |

TABLE 6

| Input | | FIG. 6 Output | | | |
|---|---|---|---|---|---|
| Primary | Sec. | (S/C)r | S/C | S/R | (S/R) |
| 90 | 10 | 100.3 | −.3 | 26.8 | 73.2 |
| 20 | 10 | 21.3 | 8.7 | 12.1 | 17.9 |
| 15 | 10 | 15.6 | 9.4 | 11.8 | 14 |
| 14 | 10 | 14.5 | 9.5 | 10.8 | 13.2 |
| 13 | 10 | 13.4 | 9.6 | 10.6 | 12.4 |
| 12 | 10 | 12.3 | 9.7 | 10.4 | 11.6 |
| 11 | 10 | 11.1 | 9.9 | 10.2 | 10.8 |
| 10 | 10 | 10 | 10 | 10 | 10 |
| 9 | 10 | 8.9 | 10.1 | 9.8 | 9.2 |
| 8 | 10 | 7.7 | 10.3 | 9.6 | 8.4 |
| 7 | 10 | 6.6 | 10.4 | 9.4 | 7.6 |
| 6 | 10 | 5.5 | 10.5 | 9.2 | 6.8 |
| 5 | 10 | 4.4 | 10.6 | 8.9 | 6.1 |
| 0 | 10 | −1.3 | 11.3 | 7.9 | 2.1 |
| −3 | 10 | −4.7 | 11.7 | 7.3 | −.3 |
| −38 | 10 | −44.2 | 16.2 | −.1 | −27.9 |

TABLE 7

| Input | | FIG. 7 Output | | | |
|---|---|---|---|---|---|
| Primary | Sec. | (S/C)r | S/C | S/R | (S/R)r |
| 25 | 10 | 46.2 | −11.4 | −.5 | 35.5 |
| 20 | 10 | 34.3 | −4.3 | 3 | 27 |
| 15 | 10 | 22.1 | 2.9 | 6.5 | 18.5 |
| 14 | 10 | 19.7 | 4.3 | 7.2 | 16.8 |
| 13 | 10 | 17.3 | 5.7 | 7.9 | 15.1 |
| 12 | 10 | 14.9 | 7.1 | 8.6 | 12.3 |
| 11 | 10 | 12.4 | 8.6 | 9.3 | 11.1 |
| 10 | 10 | 10 | 10 | 10 | 10 |
| 9 | 10 | 7.6 | 11.4 | 10.7 | 8.9 |
| 8 | 10 | 5.1 | 12.9 | 11.4 | 7.7 |
| 7 | 10 | 2.7 | 14.3 | 12.1 | 6.6 |
| 6 | 10 | 13 | 15.7 | 12.8 | 5.5 |
| 5 | 10 | −2.1 | 17.1 | 13.5 | 4.4 |
| 0 | 10 | −14.3 | 24.3 | 17 | −7 |

TABLE 8

FIG. 8

| Input | | Output | | | |
|---|---|---|---|---|---|
| Primary | Sec. | (S/C)r | S/C | S/R | (S/R)r |
| 90 | 10 | 139 | −39 | −.3 | 100.3 |
| 27 | 10 | 37.4 | −4 | 7.8 | 29.2 |
| 20 | 10 | 26.1 | 3.9 | 8.7 | 21.3 |
| 15 | 10 | 18.1 | 6.9 | 9.4 | 15.6 |
| 14 | 10 | 16.4 | 7.6 | 9.5 | 14.8 |
| 13 | 10 | 14.8 | 8.2 | 9.6 | 13.4 |
| 12 | 10 | 13.1 | 8.8 | 9.7 | 12.3 |
| 11 | 10 | 11.6 | 9.4 | 9.9 | 11.1 |
| 10 | 10 | 10 | 10 | 10 | 10 |
| 9 | 10 | 8.4 | 10.6 | 10.1 | 8.9 |
| 8 | 10 | 6.8 | 11.2 | 10.3 | 7.7 |
| 7 | 10 | 5.2 | 11.8 | 10.4 | 6.6 |
| 6 | 10 | 3.4 | 12.4 | 10.5 | 5.5 |
| 5 | 10 | 1.9 | 13.1 | 10.6 | 4.4 |
| 0 | 10 | −6.1 | 16.1 | 11.3 | −1.3 |

TABLE 9

| Input | | Output | | | |
|---|---|---|---|---|---|
| Primary | Sec. | (S/C)r | S/C | S/R | (S/R)r |
| 45 | 10 | 55.5 | −.5 | 13.2 | 41.9 |
| 20 | 10 | 23 | 7 | 10.9 | 19.1 |
| 15 | 10 | 16.5 | 8.5 | 10.5 | 14.6 |
| 14 | 10 | 15.2 | 8.8 | 10.4 | 13.6 |
| 13 | 10 | 13.9 | 9.1 | 10.3 | 12.7 |
| 12 | 10 | 12.6 | 9.4 | 10.2 | 11.8 |
| 11 | 10 | 11.3 | 9.7 | 10.1 | 10.9 |
| 10 | 10 | 10 | 10 | 10 | 10 |
| 9 | 10 | 8.7 | 10.3 | 9.9 | 9.1 |
| 8 | 10 | 7.4 | 10.6 | 9.8 | 8.2 |
| 7 | 10 | 6.1 | 10.9 | 9.7 | 7.3 |
| 6 | 10 | 4.8 | 11.2 | 9.6 | 6.4 |
| 5 | 10 | 3.5 | 11.5 | 9.5 | 5.5 |
| 0 | 10 | −3 | 13 | 9.1 | .9 |
| −1 | 10 | −4.3 | 13.3 | 9.0 | −.01 |
| −102 | 10 | −135.6 | 43.6 | −.1 | −91.9 |

TABLE 10

| Input | | Output | | | |
|---|---|---|---|---|---|
| Primary | Sec. | (R/C)r | R/C | (R/S)r | R/S |
| 20 | 10 | 36.3 | −6.3 | 17.9 | 12.1 |
| 15 | 10 | 23.2 | 1.8 | 13.9 | 11.1 |
| 14 | 10 | 20.5 | 3.5 | 13.2 | 10.8 |
| 13 | 10 | 12.9 | 5.1 | 12.4 | 10.6 |
| 12 | 10 | 15.3 | 6.7 | 11.6 | 10.4 |
| 11 | 10 | 12.6 | 8.4 | 10.8 | 10.2 |
| 10 | 10 | 10 | 10 | 10 | 10 |
| 9 | 10 | 7.4 | 11.6 | 9.2 | 9.8 |
| 8 | 10 | 4.7 | 13.3 | 8.4 | 9.6 |
| 7 | 10 | 2.1 | 14.5 | 7.6 | 9.4 |
| 6 | 10 | −.5 | 16.5 | 6.8 | 9.2 |
| 5 | 10 | −3.1 | 18.2 | 6.1 | 9 |
| 0 | 10 | −16.3 | 26.3 | 2.1 | 7.9 |
| −3 | 10 | −24.3 | 36.1 | −.3 | 7.3 |
| −40 | 10 | −121.7 | 91.7 | −29.5 | −.5 |

TABLE 11

| Input | | Output | | | |
|---|---|---|---|---|---|
| Primary | Sec. | R/C | (R/C)r | (R/S)r | R/S |
| 45 | 10 | −106.7 | 161.7 | 55.5 | −.5 |
| 20 | 10 | −23.3 | 53.3 | 23 | 7 |
| 15 | 10 | −6.7 | 31.7 | 16.5 | 8.5 |
| 14 | 10 | −3.3 | 27.3 | 15.2 | 8.8 |
| 13 | 10 | 0 | 23.2 | 13.9 | 9.1 |
| 12 | 10 | 3.3 | 18.7 | 12.6 | 9.4 |
| 11 | 10 | 6.7 | 14.3 | 11.3 | 9.7 |
| 10 | 10 | 10 | 10 | 10 | 10 |
| 9 | 10 | 13.3 | 5.7 | 8.7 | 10.3 |
| 8 | 10 | 16.7 | 1.3 | 7.4 | 10.6 |
| 7 | 10 | 20 | −3 | 6.1 | 10.9 |
| 6 | 10 | 23.3 | −7.3 | 4.8 | 11.2 |

TABLE 11-continued

| Input | | Output | | | |
|---|---|---|---|---|---|
| Primary | Sec. | R/C | (R/C)r | (R/S)r | R/S |
| 5 | 10 | 26.7 | −11.6 | 3.5 | 11.5 |
| 0 | 10 | 43.3 | −33.3 | −3 | 13 |

TABLE 12

| Input | | Output | | | |
|---|---|---|---|---|---|
| Primary | Sec. | R/C | (R/C)r | (R/S)r | R/S |
| 20 | 10 | −67.8 | 97.8 | 36.3 | −6.3 |
| 15 | 10 | −28.9 | 53.9 | 23.2 | 1.8 |
| 14 | 10 | −21.2 | 45.1 | 20.5 | 3.5 |
| 13 | 10 | −13.3 | 36.3 | 17.9 | 5.1 |
| 12 | 10 | −5.6 | 27.6 | 15.3 | 6.7 |
| 11 | 10 | 2.2 | 18.8 | 12.6 | 8.4 |
| 10 | 10 | 10 | 10 | 10 | 10 |
| 9 | 10 | 17.8 | 1.2 | 7.4 | 11.6 |
| 8 | 10 | 25.6 | −7.6 | 4.7 | 13.3 |
| 7 | 10 | 33.3 | −16.3 | 2.1 | 14.9 |
| 6 | 10 | 41.1 | −25.1 | −.5 | 16.5 |
| 5 | 10 | 48.9 | −33.9 | −3.1 | 18.2 |
| 0 | 10 | 87.8 | −77.8 | −16.3 | 26.3 |

TABLE 13

| Input | | Output | | | |
|---|---|---|---|---|---|
| Primary | Sec. | R/C | (R/C)r | (R/S)r | R/S |
| 20 | 10 | 64.4 | −34.4 | −3.3 | 33.3 |
| 15 | 10 | 37.2 | −12.2 | 3.3 | 21.7 |
| 14 | 10 | 31.8 | −7.8 | 4.7 | 19.3 |
| 13 | 10 | 26.3 | −3.3 | 6 | 17 |
| 12 | 10 | 20.9 | 1.1 | 7.3 | 14.7 |
| 11 | 10 | 15.4 | 5.6 | 8.7 | 12.3 |
| 10 | 10 | 10 | 10 | 10 | 10 |
| 9 | 10 | 4.6 | 14.4 | 11.3 | 7.7 |
| 8 | 10 | −.9 | 18.9 | 12.7 | 5.3 |
| 7 | 10 | −6.3 | 23.3 | 14 | 3 |
| 6 | 10 | −11.8 | 27.8 | 15.3 | .7 |
| 5 | 10 | −17.2 | 32.2 | 16.7 | −1.7 |
| 0 | 10 | −44.4 | 54.4 | 23.3 | −13.3 |

TABLE 14

| Input | | Output | | | |
|---|---|---|---|---|---|
| Primary | Sec. | (C/S)r | C/S | C/R | (C/R)r |
| 27 | 10 | 37.4 | −.4 | 91 | −54 |
| 20 | 10 | 26.1 | 3.9 | 57.6 | −27.6 |
| 15 | 10 | 18.1 | 6.9 | 33.8 | −8.8 |
| 14 | 10 | 16.4 | 7.6 | 29 | −.5 |
| 13 | 10 | 14.8 | 8.2 | 24.3 | −1.3 |
| 12 | 10 | 13.2 | 8.7 | 19.5 | 2.5 |
| 11 | 10 | 11.6 | 9.4 | 13.3 | 6.2 |
| 10 | 10 | 10 | 10 | 10 | 10 |
| 9 | 10 | 8.4 | 10.6 | 5.2 | 13.8 |
| 8 | 10 | 6.8 | 11.2 | .5 | 17.5 |
| 7 | 10 | 5.2 | 11.8 | −4.3 | 21.3 |
| 6 | 10 | 3.6 | 12.4 | −9 | 25 |
| 5 | 10 | 1.9 | 13.1 | −13.8 | 28.8 |
| 0 | 10 | −6.1 | 16.1 | −37.6 | 47.6 |

TABLE 15

| Input | | Output | | | |
|---|---|---|---|---|---|
| Primary | Sec. | (C/S)r | C/S | C/R | (C/R)r |
| 20 | 10 | 15.7 | 14.3 | 33.3 | −3.3 |
| 15 | 10 | 12.9 | 12.1 | 21.7 | 3.3 |
| 14 | 10 | 12.3 | 11.7 | 19.3 | 4.7 |
| 13 | 10 | 11.7 | 11.3 | 17 | 6 |
| 12 | 10 | 11.1 | 10.9 | 14.7 | 7.3 |
| 11 | 10 | 10.6 | 10.4 | 12.3 | 8.7 |
| 10 | 10 | 10 | 10 | 10 | 10 |
| 9 | 10 | 9.4 | 9.6 | 7.7 | 11.3 |
| 8 | 10 | 8.9 | 9.1 | 5.3 | 12.7 |
| 7 | 10 | 8.3 | 8.7 | 3 | 14 |

TABLE 15-continued

| Input | | Output | | | |
|---|---|---|---|---|---|
| Primary | Sec. | (C/S)r | C/S | C/R | (C/R)r |
| 6 | 10 | 7.7 | 8.3 | .7 | 15.3 |
| 5 | 10 | 7.1 | 7.9 | −1.7 | 16.7 |
| 0 | 10 | 4.3 | 5.7 | −13.3 | 23.3 |
| −15 | 10 | −4.3 | −.7 | −48.3 | 43.3 |

TABLE 16

| Input | | Output | | | |
|---|---|---|---|---|---|
| Primary | Sec. | (C/S)r | C/S | C/R | (C/R)r |
| 20 | 10 | −.4 | 30.4 | −4.3 | 34.3 |
| 15 | 10 | 4.8 | 20.2 | 2.3 | 22.1 |
| 14 | 10 | 5.8 | 18.2 | 4.3 | 19.7 |
| 13 | 10 | 6.9 | 16.1 | 5.7 | 17.3 |
| 12 | 10 | 7.9 | 14.1 | 7.1 | 14.9 |
| 11 | 10 | 9 | 12 | 8.6 | 12.4 |
| 10 | 10 | 10 | 10 | 10 | 10 |
| 9 | 10 | 11 | 7.9 | 11.4 | 7.6 |
| 8 | 10 | 12.1 | 5.9 | 12.9 | 5.1 |
| 7 | 10 | 13.1 | 3.9 | 14.3 | 2.7 |
| 6 | 10 | 14.2 | 1.8 | 15.7 | .3 |
| 5 | 10 | 15.2 | −.2 | 17.1 | −2.1 |
| 0 | 10 | 20.4 | −10.4 | 24.3 | −14.3 |

TABLE 17

| Input | | Output | | | |
|---|---|---|---|---|---|
| Primary | Sec. | (R/C)r | R/C | (R/S)r | R/S |
| 25 | 10 | 35.5 | −.5 | 17.7 | 17.4 |
| 20 | 10 | 27 | 3 | 15.1 | 14.9 |
| 15 | 10 | 18.5 | 6.5 | 12.6 | 12.5 |
| 14 | 10 | 16.8 | 7.2 | 12 | 12 |
| 13 | 10 | 15.1 | 7.9 | 11.5 | 11.5 |
| 12 | 10 | 13.4 | 8.6 | 11 | 11 |
| 11 | 10 | 11.7 | 9.3 | 10.5 | 10.5 |
| 10 | 10 | 10 | 10 | 10 | 10 |
| 9 | 10 | 8.3 | 10.7 | 9.5 | 9.5 |
| 8 | 10 | 6.6 | 11.4 | 8.9 | 9 |
| 7 | 10 | 4.9 | 12.1 | 8.5 | 8.5 |
| 6 | 10 | 3.2 | 12.8 | 8 | 8 |
| 5 | 10 | 1.5 | 13.5 | 7.5 | 7.6 |
| 0 | 10 | −7 | 17 | 4.9 | 5.1 |
| −11 | 10 | −25.7 | 24.7 | −.7 | −.3 |

TABLE 18

| Input | | Output | | | |
|---|---|---|---|---|---|
| Primary | Sec. | C/S | (C/S)r | C/R | (C/R)r |
| 20 | 10 | 57.6 | −27.6 | −67.8 | 97.8 |
| 15 | 10 | 33.8 | −8.8 | −28.9 | 53.9 |
| 14 | 10 | 29 | −5 | −21.1 | 45.1 |
| 13 | 10 | 24.3 | −1.3 | −13.3 | 36.3 |
| 12 | 10 | 19.5 | 2.5 | −5.6 | 27.6 |
| 11 | 10 | 14.8 | 6.2 | 2 | 18.8 |
| 10 | 10 | 10 | 10 | 10 | 10 |
| 9 | 10 | 5.2 | 13.8 | 17.8 | 1.2 |
| 8 | 10 | .5 | 17.5 | 25.6 | −7.6 |
| 7 | 10 | −4.3 | 21.2 | 33.3 | −16.3 |
| 6 | 10 | −9 | 25 | 41.1 | −25.1 |
| 5 | 10 | −13.8 | 28.8 | 48.9 | −33.8 |
| 0 | 10 | −37.6 | 47.6 | 87.8 | −77.8 |

TABLE 19
FIG. 19

| Input | | Output | | | |
|---|---|---|---|---|---|
| Primary | Sec. | C/S | (C/S)r | C/R | (C/R)r |
| 20 | 10 | −23.3 | 53.3 | 121.1 | −91.1 |
| 15 | 10 | −6.7 | 31.2 | 65.6 | −40.6 |
| 14 | 10 | −3.3 | 27.3 | 54.4 | −30.4 |
| 13 | 10 | 0 | 23 | 43.3 | −20.3 |
| 12 | 10 | 3.3 | 18.7 | 32.2 | −10.2 |
| 11 | 10 | 6.7 | 14.3 | 21.1 | −.1 |

TABLE 19-continued
FIG. 19

| Input | | Output | | | |
|---|---|---|---|---|---|
| Primary | Sec. | C/S | (C/S)r | C/R | (C/R)r |
| 10 | 10 | 10 | 10 | 10 | 10 |
| 9 | 10 | 13.3 | 5.7 | −1.1 | 20.1 |
| 8 | 10 | 16.7 | 1.3 | −12.2 | 30.2 |
| 7 | 10 | 20 | −3 | −23.3 | 40.3 |
| 6 | 10 | 23.3 | −7.3 | −34.4 | 50.4 |
| 5 | 10 | 26.7 | −11.7 | −45.6 | 60.6 |

TABLE 20
Single Planetary

| Input | | Output | | | |
|---|---|---|---|---|---|
| Primary | Sec. | C/S | S/C | C/R | R/C |
| 34 | 10 | 44.3 | −.3 | 90 | −46 |
| 20 | 10 | 24.3 | 5.7 | 43.3 | −13.3 |
| 15 | 10 | 17.1 | 7.9 | 26.7 | −1.7 |
| 14 | 10 | 15.7 | 8.3 | 23.3 | .7 |
| 13 | 10 | 14.3 | 8.7 | 20 | 3 |
| 12 | 10 | 12.9 | 9.1 | 16.7 | 5.3 |
| 11 | 10 | 11.4 | 9.6 | 13.3 | 7.7 |
| 10 | 10 | 10 | 10 | 10 | 10 |
| 9 | 10 | 8.6 | 10.4 | 6.7 | 12.3 |
| 8 | 10 | 7.1 | 10.9 | 3.3 | 14.7 |
| 7 | 10 | 5.7 | 11.3 | 0 | 17 |
| 6 | 10 | 4.3 | 11.7 | −3.3 | 19.3 |
| 5 | 10 | 2.9 | 12.1 | −6.7 | 21.7 |
| 4 | 10 | 1.4 | 12.6 | −10 | 2.4 |
| 3 | 10 | 0 | 13 | −13.3 | 26.3 |
| 2 | 10 | −1.4 | 13.4 | −16.7 | 28.7 |
| 1 | 10 | −2.9 | 13.9 | −20 | 31 |
| 0 | 10 | −4.3 | 14.3 | −23.3 | 33.3 |

TABLE 21

| Input | | Output | |
|---|---|---|---|
| Primary | Sec. | R/S | S/R |
| 20 | 10 | 17 | 13 |
| 15 | 10 | 13.5 | 11.5 |
| 14 | 10 | 12.8 | 11.2 |
| 13 | 10 | 12.1 | 10.9 |
| 12 | 10 | 11.4 | 10.6 |
| 11 | 10 | 10.7 | 10.3 |
| 10 | 10 | 10 | 10 |
| 9 | 10 | 9.3 | 9.7 |
| 8 | 10 | 8.6 | 9.4 |
| 7 | 10 | 7.9 | 9.1 |
| 6 | 10 | 7.2 | 8.8 |
| 5 | 10 | 6.5 | 8.5 |
| 4 | 10 | 5.8 | 8.2 |
| 3 | 10 | 5.1 | 7.9 |
| 2 | 10 | 4.4 | 7.6 |
| 1 | 10 | 3.7 | 7.3 |
| 0 | 10 | 3 | 7 |
| −1 | 10 | 2.3 | 6.7 |
| −2 | 10 | 1.6 | 6.4 |
| −3 | 10 | .9 | 6.1 |
| −4 | 10 | .2 | 5.8 |
| −5 | 10 | −.5 | 5.5 |
| −24 | 10 | −13.8 | −.2 |

It will be observed that Table 19 corresponds to the configuration of FIGS. 1 and 2 for the input corresponding to C/R. In the latter case in which the planetary carrier cage and the ring gear are the primary and secondary inputs, respectively, it is observed that there will be zero output when the secondary input has an angular velocity of 10 RPM and that of the primary input is between 9 and 10 RPM (although the units of RPM are used, any units may be selected as the values indicated are relative ones). In fact, the value corresponding to a zero output of the primary input angular velocity is 9.1 RPM. Below 9.1 RPM, the output changes direction going into rotation in a direction reverse to that of the driving angular velocities of the primary and secondary inputs. It will also be observed that at equal primary and secondary velocities, the output velocity of the planetary gear arrangement is equal to that of each of the input velocities. It will also be observed that in the configuration of FIG. 19 for C/R, actual operation of the automatic transmission takes place over only a very narrow part of the table indicated insofar as the relative velocity of primary and secondary inputs is concerned. The actual velocity range of the primary input relative to the secondary will probably be no more than 0.91 to 1.1 or 9.1 RPM to 11 RPM as seen in Table 19.

All of the configurations, FIGS. 5 to 19, will function adequately provided the ratio of primary and secondary input velocity is allowed to vary over a sufficiently large range. Obviously, a requirement for adequate functioning is that a large enough variation of primary to secondary velocity will drive the output to zero without the need to reverse either of the primary or secondary velocities. However, it should be noted that even if a reversal of one of the inputs is required, a configuration of the planetary gear sets necessitating such a reversal could be made operative with the configurations illustrated in FIG. 4, as one of the electric motors could easily be selected which could reverse its direction of rotation to accommodate such a requirement. It will be observed that some of the configurations do not have a marked gearing down effect as does the configuration in FIG. 19 previously discussed. In such cases, additional gearing down may be obtained by compounding additional planetary gear assemblies after the second planetary gear assemblies. However, the commercial practicality of such a solution in certain cases may be questionable.

Based on the foregoing criterion for operability, it will be observed that several of the embodiments illustrated in FIGS. 5 to 21 are inoperable. For example, the configuration of FIG. 5 reaches the two inputs where the reversed or otherwise indicates requirements for a reversal of one of the inputs in order to drive the output to zero. Consequently, configuration of FIG. 5 is inoperable for each of the inputs tabulated in Table 5.

The configuration of FIG. 6 is also inoperable when the two inputs are a combination of the ring gear and sun gear of the first planetary gear assembly. Similar remarks apply to the configurations of FIGS. 9, 10 and 17. The configuration of FIG. 15 is inoperable when the inputs are a combination of the sun gear and the planetary carrier cage.

For the single planetary gear assembly the only configuration which is inoperable is that corresponding to inputs comprised of a combination of the ring gear and sun gear as shown in FIG. 21 and the results for which are tabulated in Table 21.

It will be obvious that other ways of coupling the motor or motors to the planetary gear assembly may be selected. For example, one may employ a torque converter and speed adjusting gears in place of a constant torque fluid coupling. The speed adjusting gears would be used to either enhance the speed of the fluid coupled line or reduce the speed of the other line in order to obtain the proper range of angular speeds for driving the primary and secondary driving members.

A new set of speed adjusting gears may also be employed in that coupling means which is fluid coupled to obtain a preselected amount of overdrive.

One may elect for certain configurations such as that of FIG. 19 to operate in a reverse mode in which the output shaft from the tandem-connected planetary gear assemblies rotates in a direction reversed to that of the driving members of the first planetary gear assembly. In this case, a one-way clutch would have to be mounted reverse to that of its mounting for forward rotation and the driving speed of the first and second coupling means adjusted accordingly by speed adjusting gears if necessary.

Figure 29:
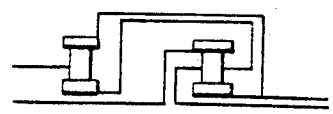

The configurations of interest can be classified as follows:
(1) with carrier of one set connected to carrier of other set as in FIG. 30.
(2) the two inputs connected to the two carriers as in FIGS. 27 and 28;
(3) with the inputs connected to the carrier and sun and the ring gear of each set connected to each other and the output taken from the ring gear FIG. 22.
(4) with the inputs connected to the carrier and ring and the sun gear of each set connected to each other and the output taken from the sun gear, FIG. 24.
(5) with the inputs connected to the carrier and sun and the other sun and a ring gear interconnected and output taken from same. (FIG. 25).
(6) with the inputs connected to the ring and carrier and the other ring gear and a sun interconnected and output taken from same. (FIG. 29).

The invention therefore further includes:
(1) the combination of 1, 2, 3, 4, 5 or 6 with the invention previously described; and
(2) a method of reducing the wear of the apex and side seals in a rotary engine.

The inventor knows of no configurations such as the above, with two inputs. However, similar configurations have been found where one of the inputs is permanently fixed. Such configurations, however, have constant gear ratios.

The new features which are included are the use of rotary engines in the two engine system and the new configurations in which a pair of planetary gear assemblies are connected with one driving input to one gear of one assembly and the other driving input to one gear of the other assembly. The remaining gears are connected in pairs and an output is taken off one of those pairs.

The advantage derived from using rotary gears is as follows. Since two engines are used, each can be half the size of the single engine they replace and still give equal power. However, since the transmission is capable of greater gear reduction, solving the problem of lack of torque at low engine r.p.m., each of the two engines can again be reduced to half so the total volume reduction of the working chambers is to $\frac{1}{4}$ size.

The biggest problem with rotary gears is the problem of the wear of the open seal. The friction on the seals is a function of r.p.m. and of the radices of rotation of the rotors. But the radius of rotation of the rotors varies with the cube of the volume approximately so if each of two engines are $\frac{1}{4}$ size of the engine they replace, the radius of rotation is $3\sqrt{1^3/4} = 0.631$ approximately and the friction is automatically reduced by about $\frac{1}{3}$ as compared to an ordinary rotary, thereby increasing the life expectancy of the open seal.

From Tables 22 to 31 and FIGS. 22 to 31, it is apparent that there are additional configurations of this type which are not disclosed in the previous discussions.

Figure 21A:
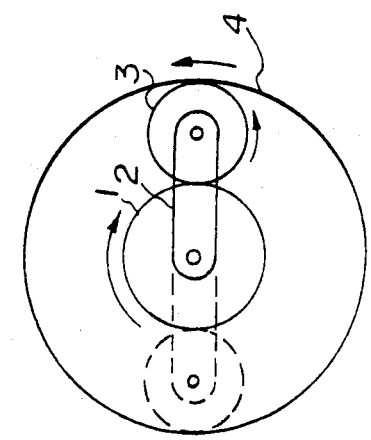
FIG. 21a illustrates in schematic form a planetary gear assembly.

For the train value e, e', refer to FIG. 21a which shows sun gear 1, carrier arm 2, pinion gear 3 and ring gear 4. With carrier arm 2 fixed from moving and sun gear turning the planet, pinion gear 3 turns the ring gear 4 as shown.

For the first gear turning in the opposite direction of the last gear, the sign of the train value e is (−) negative by convention. The train value is defined as follows and is a constant of any gear train:

$$e = \frac{\text{product of driving tooth numbers}}{\text{product of driven tooth numbers}}$$

For the above case, with number of teeth designated as $T_s$, $T_p$, $T_r$, or $T_1$, $T_3$, $T_4$:

$$e = \frac{T_s \times T_p}{T_p \times T_r} = \frac{-T_s}{T_r}$$

For the Tables 22 to 31, the value used for $e = e' = -18 \div 42 = -3/7$. Next we designate the speed of the gear 1 relative to the arm 2 as $n_{12}$ and likewise the speed of gear 4 relative to the arm 2 as $n_{42}$. Then $$n_{12} = n_1 - n_2 \text{ and } n_{42} = n_4 - n_2$$

$$\frac{n_{42}}{n_{12}} = \frac{n_4 - n_2}{n_1 - n_2}$$

The following is an explanation of Tables 22 to 31 and FIGS. 22 to 31.

EXAMPLE—FIG. 22

In Tables 22 to 36, the following hold:

(1) Speed of components of first planetary gear assembly denoted as:
 (i) ring gear—$n_r$
 (ii) carrier arm—$n_a$
 (iii) sun gear—$n_s$ (2) Speed components of second planetary assembly denoted as:
 (i) ring gear—$n'_r$
 (ii) carrier arm—$n'_a$
 (iii) sun gear—$n'_s$ (3) The train value of first assembly denoted as e and that for second assembly deooted as e'.

Now, since $n_{42}/n_{12}$ is the velocity of ring gear relative to the velocity of the sun gear, and both are relative to the velocity of the arm, we set the velocity of the arm equal to zero and get $$\frac{n_{42}}{n_{12}} = \frac{n_4 - n_2}{n_1 - n_2} = \frac{n_4 - 0}{n_1 - 0} = \frac{n_4}{n_1} = e$$

Then $$e = \frac{-T_s}{T_r} = \frac{n_4 - n_2}{n_1 - n_2} = \frac{n_r - n_a}{n_s - n_a}$$

Therefore, we can find e from the tooth numbers and we can find the speed of any gear if we know the speed of the other two.

Figure 22:
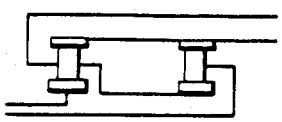
FIGS. 22 to 31 illustrate alternative gear assembly arrangements.

Referring to FIG. 22 once more, there are two inputs, one to each assembly. We designate the velocity ratio of the inputs as follows:

$$x = \frac{n'_a}{n_s} \text{ for FIG. 22;}$$

also $e = e' = -3/7$, and further $$e = \frac{-3}{7} = \frac{n_r - n_a}{n_s - n_a} \text{ and} \qquad \text{(Equation 1)}$$

$$e' = \frac{-3}{7} = \frac{n'_r - n'_a}{n'_s - n'_a} \qquad \text{(Equation 2)}$$

since the ring of first assembly is connected to the ring of second assembly $n_r = n'_r$. Similarly, $n_a = n'_s$.

Therefore, we have $$e = \frac{-3}{7} = \frac{n_r - n_a}{n_s - n_a} \qquad (1)$$

$$e' = e = \frac{-3}{7} = \frac{n'_r - n'_a}{n'_s - n'_a} \qquad (2)$$

$$n'_r = n_r \qquad (3)$$

$$n_a = n'_s \qquad (4)$$

and $$n_s x = n'_a \text{ or } x = n'_a/n_s \qquad (5)$$

Substituting 3, 4, 5 into 2, we get $$e = \frac{n_r - n_s x}{n_a - n_s x}$$

and solving 1 and 2 for $n_a$:

$$e n_a - e n_s x = n_r - n_s x$$

$$e n_a = n_r + e n_s x - n_s x$$

$$n_a = \frac{n_r + e n_s x - n_s x}{e} \qquad (6)$$

$$e n_s - e n_a = n_r - n_a$$

$$e n_s - n_r = e n_a - n_a$$

$$e n_s - n_r = (e - 1) n_a$$

$$n_a = \frac{e n_s - n_r}{e - 1} \qquad (7)$$

and equating equation 6 and 7:

$$\frac{n_r + e n_s x - n_s x}{e} = \frac{e n_s - n_r}{e - 1}$$

$$n_r (e - 1) + e n_s x (e - 1) - n_s x (e - 1) = e^2 n_s - e n_r$$

$$e n_s x (e - 1) - n_s x (e - 1) - e^2 n_s = -e n_r - n_r(e - 1)$$

$$e^2 n_s x - e n_s x - e n_s x + n_s x - e^2 n_s = -e n_r - e n_r + n_r$$

$$n_s (e^2 x - ex - ex + x - e^2) = n_r (1 - e - e)$$

and $$n_r = n_s \frac{(e^2 x - 2ex + x - e^2)}{1 - 2e}$$

-continued and using $e = -3/7$ $$n_r = n_s \frac{(100x - 9)}{91}$$

Referring to Table 22 once again, the driving configuration is indicated by $n'_a/n_s$ or $n_s/n'_a$ where $n'_a/n_s$ indicates that $n'_a$ is the primary driving gear and $n_s$ is the secondary driving gear; and where $n_s/n'_a$ indicates $n_s$ is the primary and $n'_a$ the secondary. This is similar for all the tables. The outputs are indicated by the columns headed by $n_{=n's}$ and $n_r=n'_r$, etc.

A configuration works if the output is not between the two inputs.

Other obvious variations, modifications and departures of the specific method and apparatus described above without departing from the scope of the present invention as set forth in the accompanying claims will readily occur to those skilled in the art.

TABLE 22

(See FIG. 22)

| | | $n'_a/n_s$ | | $n_s = n'_a$ | |
|---|---|---|---|---|---|
| Primary | Secondary | $n_a = n'_s$ | $n_r = n'_r$ | $n_a = n'_s$ | $n_r = n'_r$ |
| 20 | 10 | 17.7 | 21.0 | 12.3 | 9.0 |
| 19 | 10 | 17.0 | 19.9 | 12.1 | 9.1 |
| 18 | 10 | 16.2 | 18.8 | 11.8 | 9.2 |
| 17 | 10 | 15.4 | 17.7 | 11.6 | 9.3 |
| 16 | 10 | 14.6 | 16.6 | 11.4 | 9.4 |
| 15 | 10 | 13.8 | 15.5 | 11.2 | 9.5 |
| 14 | 10 | 13.1 | 14.4 | 10.9 | 9.6 |
| 13 | 10 | 12.3 | 13.3 | 10.7 | 9.7 |
| 12 | 10 | 11.5 | 12.2 | 10.5 | 9.8 |
| 11 | 10 | 10.8 | 11.1 | 10.2 | 9.9 |
| 10 | 10 | 10.0 | 10.0 | 10.0 | 10.0 |
| 9 | 10 | 9.2 | 8.9 | 9.8 | 10.1 |
| 8 | 10 | 8.5 | 7.8 | 9.5 | 10.2 |
| 7 | 10 | 7.7 | 6.7 | 9.3 | 10.3 |
| 6 | 10 | 6.9 | 5.6 | 9.1 | 10.4 |
| 5 | 10 | 6.2 | 4.5 | 8.8 | 10.5 |
| 4 | 10 | 5.4 | 3.4 | 8.6 | 10.6 |
| 3 | 10 | 4.6 | 2.3 | 8.4 | 10.7 |
| 2 | 10 | 3.8 | 1.2 | 8.2 | 10.8 |
| 1 | 10 | 3.1 | .1 | 7.9 | 10.9 |
| 0 | 10 | 2.3 | −1.0 | 6.7 | 11.0 |

TABLE 23

Figure 23:
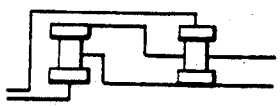

(See FIG. 23)

| | | $n'_r/n_s$ | | $n_s/n'_r$ | |
|---|---|---|---|---|---|
| Primary | Secondary | $n_r = n'_a$ | $n_a = n'_s$ | $n_r = n'_a$ | $n_a = n'_s$ |
| 20 | 10 | 18.9 | 16.2 | 11.1 | 13.9 |
| 19 | 10 | 18.0 | 15.6 | 11.0 | 13.4 |
| 18 | 10 | 17.1 | 15.0 | 10.9 | 13.0 |
| 17 | 10 | 16.2 | 14.3 | 10.8 | 12.7 |
| 16 | 10 | 15.3 | 13.7 | 10.7 | 12.3 |
| 15 | 10 | 14.4 | 13.1 | 10.6 | 11.9 |
| 14 | 10 | 13.5 | 12.5 | 10.5 | 11.5 |
| 13 | 10 | 12.7 | 11.9 | 10.3 | 11.1 |
| 12 | 10 | 11.8 | 11.2 | 10.2 | 10.8 |
| 11 | 10 | 10.9 | 10.6 | 10.1 | 10.4 |
| 10 | 10 | 10.0 | 10.0 | 10.0 | 10.0 |
| 9 | 10 | 9.1 | 9.4 | 9.9 | 9.6 |
| 8 | 10 | 8.2 | 8.8 | 9.8 | 9.2 |
| 7 | 10 | 7.3 | 8.1 | 9.7 | 8.9 |
| 6 | 10 | 6.5 | 7.5 | 9.5 | 8.5 |
| 5 | 10 | 5.6 | 6.9 | 9.4 | 8.1 |
| 4 | 10 | 4.7 | 6.3 | 9.3 | 7.7 |
| 3 | 10 | 3.8 | 5.6 | 9.2 | 7.3 |
| 2 | 10 | 2.9 | 5.0 | 9.1 | 7.0 |
| 1 | 10 | 2.0 | 4.4 | 9.0 | 6.6 |
| 0 | 10 | 1.1 | 3.8 | 8.9 | 6.2 |

TABLE 24

Figure 24:
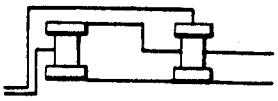
Figure 25:
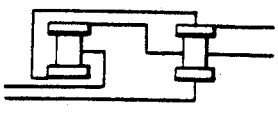

(See FIG. 24)

| | | $n'_r/n_a$ | | $n_a/n'_r$ | |
|---|---|---|---|---|---|
| Primary | Secondary | $n_r = n'_a$ | $n_s = n'_s$ | $n_r = n'_a$ | $n_s = n'_s$ |
| 20 | 10 | 14.1 | 0.4 | 15.9 | 29.6 |
| 19 | 10 | 13.7 | 1.4 | 15.3 | 27.6 |
| 18 | 10 | 13.3 | 2.3 | 14.7 | 25.7 |
| 17 | 10 | 12.9 | 3.3 | 14.1 | 23.7 |
| 16 | 10 | 12.5 | 4.2 | 13.5 | 21.8 |
| 15 | 10 | 12.1 | 5.2 | 12.9 | 19.8 |
| 14 | 10 | 11.6 | 6.2 | 12.4 | 17.8 |
| 13 | 10 | 11.2 | 7.1 | 11.8 | 15.9 |
| 12 | 10 | 10.8 | 8.1 | 11.2 | 13.9 |
| 11 | 10 | 10.4 | 9.0 | 10.6 | 12.0 |
| 10 | 10 | 10.0 | 10.0 | 10.0 | 10.0 |
| 9 | 10 | 9.6 | 11.0 | 9.4 | 8.0 |
| 8 | 10 | 9.2 | 11.9 | 8.8 | 6.1 |
| 7 | 10 | 8.8 | 12.8 | 8.2 | 4.1 |
| 6 | 10 | 8.4 | 13.8 | 7.6 | 2.2 |
| 5 | 10 | 7.9 | 14.8 | 7.1 | 0.2 |
| 4 | 10 | 7.5 | 15.8 | 6.5 | −1.8 |
| 3 | 10 | 7.1 | 16.7 | 5.9 | −3.7 |
| 2 | 10 | 6.7 | 17.7 | 5.3 | −5.7 |
| 1 | 10 | 6.3 | 18.6 | 4.7 | −7.6 |
| 0 | 10 | 5.9 | 19.6 | 4.1 | −9.6 |

TABLE 25

(See FIG. 25)

| | | $n'_s/n_a$ | | $n_a/n'_s$ | |
|---|---|---|---|---|---|
| Primary | Secondary | $n_r = n'_a$ | $n_s = n'_r$ | $n_r = n'_a$ | $n_s = n'_r$ |
| 20 | 10 | 11.1 | 7.3 | 18.9 | 22.7 |
| 19 | 10 | 11.0 | 7.6 | 17.8 | 21.4 |
| 18 | 10 | 10.9 | 7.9 | 17.1 | 20.1 |
| 17 | 10 | 10.8 | 8.1 | 16.2 | 18.9 |
| 16 | 10 | 10.7 | 8.4 | 15.3 | 17.6 |
| 15 | 10 | 10.6 | 8.7 | 14.4 | 16.3 |
| 14 | 10 | 10.5 | 8.9 | 13.5 | 15.1 |
| 13 | 10 | 10.3 | 9.2 | 12.7 | 13.8 |
| 12 | 10 | 10.2 | 9.5 | 11.8 | 12.5 |
| 11 | 10 | 10.1 | 9.7 | 10.9 | 11.3 |
| 10 | 10 | 10.0 | 10.0 | 10.0 | 10.0 |
| 9 | 10 | 9.9 | 10.3 | 9.1 | 8.7 |
| 8 | 10 | 9.8 | 10.5 | 8.2 | 7.5 |
| 7 | 10 | 9.7 | 10.8 | 7.3 | 6.2 |
| 6 | 10 | 9.5 | 11.1 | 6.5 | 4.9 |
| 5 | 10 | 9.4 | 11.3 | 5.6 | 3.7 |
| 4 | 10 | 9.3 | 11.6 | 4.7 | 2.4 |
| 3 | 10 | 9.2 | 11.9 | 3.8 | 1.1 |
| 2 | 10 | 9.1 | 12.1 | 2.9 | −0.1 |
| 1 | 10 | 9.0 | 12.4 | 2.0 | −1.4 |
| 0 | 10 | 8.9 | 12.7 | 1.1 | −2.7 |

TABLE 26

Figure 26:
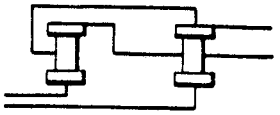

(See FIG. 26)

| | | $n'_s/n_s$ | | $n_s/n'_s$ | |
|---|---|---|---|---|---|
| Primary | Secondary | $n_r = n'_a$ | $n_a = n'_r$ | $n_r = n'_a$ | $n_a = n'_r$ |
| 20 | 10 | 15.9 | 14.1 | 14.1 | 15.9 |
| 19 | 10 | 15.3 | 13.7 | 13.7 | 15.3 |
| 18 | 10 | 14.7 | 13.3 | 13.3 | 14.7 |
| 17 | 10 | 14.1 | 12.9 | 12.9 | 14.1 |
| 16 | 10 | 13.5 | 12.5 | 12.5 | 13.5 |
| 15 | 10 | 12.9 | 12.1 | 12.1 | 12.9 |
| 14 | 10 | 12.4 | 11.6 | 11.6 | 12.4 |
| 13 | 10 | 11.8 | 11.2 | 11.2 | 11.8 |
| 12 | 10 | 11.2 | 10.8 | 10.8 | 11.2 |
| 11 | 10 | 10.6 | 10.4 | 10.4 | 10.6 |
| 10 | 10 | 10.0 | 10.0 | 10.0 | 10.0 |
| 9 | 10 | 9.4 | 9.6 | 9.6 | 9.4 |
| 8 | 10 | 8.8 | 9.2 | 9.2 | 8.8 |
| 7 | 10 | 8.2 | 8.8 | 8.8 | 8.2 |
| 6 | 10 | 7.6 | 8.4 | 8.4 | 7.6 |
| 5 | 10 | 7.1 | 7.9 | 7.9 | 7.1 |
| 4 | 10 | 6.5 | 7.5 | 7.5 | 6.5 |
| 3 | 10 | 5.9 | 7.1 | 7.1 | 5.9 |
| 2 | 10 | 5.3 | 6.7 | 6.7 | 5.3 |
| 1 | 10 | 4.7 | 6.3 | 6.3 | 4.7 |

TABLE 26-continued (See FIG. 26)

| | | n'$_s$/n$_s$ | | n$_s$/n'$_s$ | |
|---|---|---|---|---|---|
| Primary | Secondary | n$_r$ = n'$_a$ | n$_a$ = n'$_r$ | n$_r$ = n'$_a$ | n$_a$ = n'$_r$ |
| 0 | 10 | 4.1 | 5.9 | 5.9 | 4.1 |

TABLES 27 and 28

Figure 27:
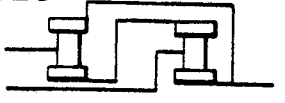
Figure 28:
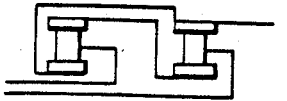

(See FIGS. 27 and 28)

| | | n'$_a$/n$_a$ | | n$_a$/n'$_a$ | |
|---|---|---|---|---|---|
| Primary | Secondary | n$_r$ = n'$_s$ | n$_s$ = n'$_r$ | n$_r$ = n'$_s$ | n$_s$ = n'$_r$ |
| 20 | 10 | 2.5 | 27.5 | 27.5 | 25.0 |
| 19 | 10 | 3.3 | 25.8 | 25.8 | 3.3 |
| 18 | 10 | 4.0 | 2.4 | 2.4 | 4.0 |
| 17 | 10 | 4.8 | 22.3 | 22.3 | 4.8 |
| 16 | 10 | 5.5 | 20.5 | 20.5 | 5.5 |
| 15 | 10 | 6.3 | 18.8 | 18.8 | 6.3 |
| 14 | 10 | 7.0 | 17.0 | 17.0 | 7.0 |
| 13 | 10 | 7.8 | 15.3 | 15.3 | 7.8 |
| 12 | 10 | 8.5 | 13.5 | 13.5 | 8.5 |
| 11 | 10 | 9.3 | 11.8 | 11.8 | 9.3 |
| 10 | 10 | 10.0 | 10.0 | 10.0 | 10.0 |
| 9 | 10 | 10.8 | 8.3 | 8.3 | 10.8 |
| 8 | 10 | 11.5 | 6.5 | 6.5 | 11.5 |
| 7 | 10 | 12.3 | 4.8 | 4.8 | 12.3 |
| 6 | 10 | 13.0 | 3.0 | 3.0 | 13.0 |
| 5 | 10 | 13.8 | 1.3 | 1.3 | 13.8 |
| 4 | 10 | 14.5 | −0.5 | −0.5 | 14.5 |
| 3 | 10 | 15.3 | −2.3 | −2.3 | 15.3 |
| 2 | 10 | 16.0 | −4.0 | −4.0 | 16.0 |
| 1 | 10 | 16.8 | −5.8 | −5.8 | 16.8 |
| 0 | 10 | 17.5 | −7.5 | −7.5 | 17.5 |

TABLE 29

(See FIG. 29)

| | | n'$_r$/n$_a$ | | n$_a$/n'$_r$ | |
|---|---|---|---|---|---|
| Primary | Secondary | n$_r$ = n'$_s$ | n$_s$ = n'$_a$ | n$_r$ = n'$_s$ | n$_s$ = n'$_a$ |
| 20 | 10 | 7.3 | 16.2 | 22.7 | 13.8 |
| 19 | 10 | 6.7 | 15.6 | 21.4 | 13.4 |
| 18 | 10 | 7.9 | 15.0 | 20.1 | 13.0 |
| 17 | 10 | 8.1 | 14.3 | 18.9 | 12.7 |
| 16 | 10 | 8.4 | 13.7 | 17.6 | 12.3 |
| 15 | 10 | 8.7 | 13.1 | 16.3 | 11.9 |
| 14 | 10 | 8.9 | 12.5 | 15.1 | 11.5 |
| 13 | 10 | 9.2 | 11.9 | 13.8 | 11.1 |
| 12 | 10 | 9.5 | 11.2 | 12.5 | 10.8 |
| 11 | 10 | 9.7 | 10.6 | 11.3 | 10.4 |
| 10 | 10 | 10.0 | 10.0 | 10.0 | 10.0 |
| 9 | 10 | 10.3 | 9.4 | 8.7 | 9.6 |
| 8 | 10 | 10.5 | 8.8 | 7.5 | 9.2 |
| 7 | 10 | 10.8 | 8.1 | 6.2 | 8.9 |
| 6 | 10 | 11.1 | 7.5 | 4.9 | 8.5 |
| 5 | 10 | 11.3 | 6.9 | 3.7 | 8.1 |
| 4 | 10 | 11.6 | 6.3 | 2.4 | 7.7 |
| 3 | 10 | 11.9 | 5.7 | 1.1 | 7.3 |
| 2 | 10 | 12.1 | 5.0 | −1.0 | 7.0 |
| 1 | 10 | 12.4 | 4.4 | −1.4 | 6.6 |
| 0 | 10 | 12.7 | 3.8 | −2.7 | 6.2 |

TABLE 30

Figure 30:
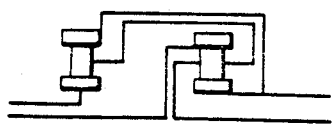

(See FIG. 30)

| | | n'$_r$/n$_s$ | | n$_s$/n'$_r$ | |
|---|---|---|---|---|---|
| Primary | Secondary | n$_r$ = n'$_s$ | n$_a$ = n'$_a$ | n$_r$ = n'$_s$ | n$_a$ = n'$_a$ |
| 20 | 10 | 27.5 | 22.3 | 2.5 | 7.8 |
| 19 | 10 | 25.8 | 21.0 | 3.3 | 8.0 |
| 18 | 10 | 24.0 | 19.8 | 4.0 | 8.2 |
| 17 | 10 | 22.3 | 18.6 | 4.8 | 8.4 |
| 16 | 10 | 20.5 | 17.4 | 5.5 | 8.7 |
| 15 | 10 | 18.8 | 16.1 | 6.3 | 8.9 |
| 14 | 10 | 17.0 | 14.9 | 7.0 | 9.1 |
| 13 | 10 | 15.3 | 13.7 | 7.8 | 9.3 |
| 12 | 10 | 13.5 | 12.5 | 8.5 | 9.6 |
| 11 | 10 | 11.8 | 11.2 | 9.3 | 9.8 |
| 10 | 10 | 10.0 | 10.0 | 10.0 | 10.0 |

TABLE 30-continued (See FIG. 30)

| | | n'$_r$/n$_s$ | | n$_s$/n'$_r$ | |
|---|---|---|---|---|---|
| Primary | Secondary | n$_r$ = n'$_s$ | n$_a$ = n'$_a$ | n$_r$ = n'$_s$ | n$_a$ = n'$_a$ |
| 9 | 10 | 8.3 | 8.8 | 10.8 | 10.2 |
| 8 | 10 | 6.5 | 7.6 | 11.5 | 10.5 |
| 7 | 10 | 4.8 | 6.3 | 12.3 | 10.7 |
| 6 | 10 | 3.0 | 5.1 | 13.0 | 10.9 |
| 5 | 10 | 1.3 | 3.9 | 13.8 | 11.1 |
| 4 | 10 | −0.5 | 2.7 | 14.5 | 11.4 |
| 3 | 10 | −2.3 | 1.4 | 15.3 | 11.6 |
| 2 | 10 | −4.0 | 0.2 | 16.0 | 11.8 |
| 1 | 10 | −5.8 | −1.0 | 16.8 | 12.0 |
| 0 | 10 | −7.5 | −2.3 | 17.5 | 12.3 |

TABLE 31

Figure 31:
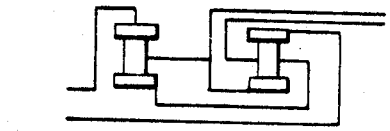

(See FIG. 31)

| | | n'$_r$/n$_r$ | | n$_r$/n'$_r$ | |
|---|---|---|---|---|---|
| Primary | Secondary | n$_s$ = n'$_a$ | n$_a$ = n'$_s$ | n$_s$ = n'$_a$ | n$_a$ = n'$_s$ |
| 20 | 10 | 17.7 | 12.3 | 12.3 | 17.7 |
| 19 | 10 | 16.9 | 12.1 | 12.1 | 16.9 |
| 18 | 10 | 15.2 | 11.8 | 11.8 | 15.2 |
| 17 | 10 | 15.4 | 11.6 | 11.6 | 15.4 |
| 16 | 10 | 14.6 | 11.4 | 11.4 | 14.6 |
| 15 | 10 | 13.8 | 11.2 | 11.2 | 13.8 |
| 14 | 10 | 13.1 | 10.9 | 10.9 | 13.1 |
| 13 | 10 | 12.3 | 10.7 | 10.7 | 12.3 |
| 12 | 10 | 11.5 | 10.5 | 10.5 | 11.5 |
| 11 | 10 | 10.7 | 10.2 | 10.2 | 10.7 |
| 10 | 10 | 10.0 | 10.0 | 10.0 | 10.0 |
| 9 | 10 | 9.2 | 9.8 | 9.8 | 9.2 |
| 8 | 10 | 8.5 | 9.5 | 9.5 | 8.5 |
| 7 | 10 | 7.7 | 9.3 | 9.3 | 7.7 |
| 6 | 10 | 6.9 | 9.1 | 9.1 | 6.9 |
| 5 | 10 | 6.2 | 8.8 | 8.8 | 6.2 |
| 4 | 10 | 5.4 | 8.6 | 8.6 | 5.4 |
| 3 | 10 | 4.6 | 8.4 | 8.4 | 4.6 |
| 2 | 10 | 3.8 | 8.2 | 8.2 | 3.8 |
| 1 | 10 | 3.1 | 7.9 | 7.9 | 3.1 |
| 0 | 10 | 2.3 | 7.7 | 7.7 | 2.3 |

SUMMARY AND THEORY

In summary, the dual rotary inputs for the embodiments of FIGS. 5–31 can take various forms. For example, the speed of one of the inputs can be dependent upon or influenced by the speed of the other input as in the case of (1) a single engine/fluid coupling arrangement in which the engine provides one rotary input (via gearing, direct coupling or otherwise) and the engine-driven fluid coupling provides the second input; or (2) a dual motor/engine arrangement in which the two motors/engines are controlled such that a change in speed of one motor/engine and its rotary input is accompanied by a corresponding change in speed of the other motor/engine and rotary input. Alternatively, the two rotary inputs can be completely independent of one another as in the case of two independently controlled motors/engines coupled to the planetary gear arrangement.

The latter power source arrangement is particularly advantageous when coupled to a planetary gear arrangement capable of producing a broad output speed range from two rotary inputs maintained within a narrow input speed range, making it possible for the two motors/engines to be operated at close to their optimum speeds for virtually all operating conditions. In this way, the overall system can be made to operate very efficiently at virtually all operating speeds, including zero and low output speeds, and hence requires less total horsepower for a given application than a single motor/engine system which inherently must be operated outside its most efficient speed range of the engine/motor some of the time. For example, in the case of an automobile, the two engine system as described requires less total horsepower to meet torque demands (as determined by selected design criteria) than a conventional single engine system requiring excessive horsepower to make up for its relative inefficiency at speeds outside its optimum range.

Tables 5-31 tabulate output speeds for different embodiments of the present invention having two independent rotary inputs, one of which is fixed at a speed of 10 RPM (by way of illustration) and the other permitted to vary over a specified speed range. Using Table 19 and corresponding FIG. 19 as an example, assuming the primary rotary input is coupled to carrier 42 and the secondary rotary input is coupled to ring gear 40 (FIG. 19), and further assuming that the two motors/engines are designed to operate most efficiently at 10 RPM, it can be seen that the speed of the primary input (first engine) need only vary from 9 RPM to 11 RPM (a narrow speed range close to its optimum speed) to produce a broad output speed range of $-1.1$ RPM to 21.0 RPM, including a "neutral" zero output speed necessary for most transmission applications. Similarly, with reference to Table 12 and FIG. 12, if the primary input is coupled to ring gear 40 and the secondary input is coupled to carrier 42, and ring gear 40 has a fixed speed of 10 RPM, the speed of carrier 42 need only vary from 8 RPM to 12 RPM to produce a broad output speed range of $-7.6$ RPM to 27.6 RPM.

It will be apparent from Tables 5 to 31, which assumes a train value of $-3/7$ for each planetary gear assembly involved, that not all embodiments are practical as power transmissions under the assumed conditions and that the performance and efficiency of each embodiment varies. For some embodiments, a common train value other than $-3/7$ for both planetary gear sets or, alternatively, different train values for the two gear sets will be necessary to optimize the system's efficiency and performance. It has been found that some train value(s) or combination thereof can be selected for most of the embodiments of FIGS. 5-31 to produce a practical power transmission for at least some applications. Each of the embodiments can be analyzed by the mathematical relationship:

$$nx = P(ny) + Q(nz)$$

where "nx" is the speed of the gear element from which the output is taken, "ny" is the speed of the gear element coupled to the first rotary input, "nz" is the speed of the gear element coupled to the second rotary input, and "P" and "Q" are constant coefficients which are functions of the train values ($e_1$ and $e_2$) of the respective planetary gear sets. Thus, for example, as previously indicated, planetary gear assembly 36 of FIG. 1 can be represented by the relationship:

$$N_{s2} = \frac{-91 n_R}{9} + \frac{100 N_A}{9}$$

where $N_{s2}$ is the speed of sun gear 52 (and output shaft), $n_R$ is the speed of ring gear 40 and one of the rotary inputs, $N_A$ is the speed of carrier 42 and the other rotary input, and both gear assemblies 38, 46 have a train value of $-3/7$. In this case, P is $-91/9$ and Q is $100/9$.

Similarly, as previously indicated, the planetary gear assembly of FIG. 22 can be represented by the relationship:

$$N_r = \frac{N_s(100x - 9)}{91} \text{ where } x = \frac{N_a'}{N_s}$$

Thus, $$N_r = \frac{100 N_a'}{91} - \frac{9 N_s}{91}$$

where $N_r$ is the speed of both ring gears and the output shaft, $N_a'$ is the speed of the carrier of the second planetary gear assembly (as well as the speed of ne rotary input), $N_s$ is the speed of the sun gear of the first gear assembly (as well as the speed of the other rotary input), and both gear assemblies have an assumed train value of $-3/7$. In this case, the coefficients P and Q are 100/91 and $-9/91$, respectively.

By selecting appropriate train values for each embodiment of FIGS. 5-31, such that the sum of the coefficients P and Q approaches but does not equal zero (i.e., $P+Q>0$), the differential effect, feasibility, and performance of the transmission is optimized. The coefficients P and Q should at least have a 3:2 ratio and an opposite sign, but not have a sum equal to zero. If the sum equals zero, free wheeling will occur. Thus, in the two examples above, with assumed train values of $e_1 = e_2 = -3/7$, planetary gear assembly 36 of FIG. 1 is a highly practical transmission of superior performance, particularly when used with two independent sources of rotary power, thereby permitting the speed of one rotary power source to be fixed at its optimum operating speed setting and the other rotary power source to be varied within a relatively narrow speed range close to its operating range. However, the planetary gear assembly of FIG. 22 is not practical for the given train value, as evident from the large difference in magnitude between coefficients P and Q.

It has been found that it is possible to select appropriate train values for the embodiments of FIGS. 5-31 (except for FIG. 21) within the practical range of 1/11 to 10/11 and $-1/11$ to $-10/11$ such that the sum of coefficients P and Q is sufficiently close to zero as to make the transmission system practical and advantageous. It will be appreciated, however, that variations in performance and efficiency still exist and that some embodiments can be used practically only with a small group of possible train value combinations while others can be used practically with a much larger group of train value combinations.

Having illustrated and described the principles of the invention in a preferred embodiment, it should be apparent to those skilled in the art that the invention can be modified in arrangement and detail without departing from such principles. I claim all modifications coming within the spirit and scope of the following claims.

I claim:

1. An apparatus for transmitting power comprising:
a first prime mover;
a second prime mover;
means for controlling the respective speeds of the first and second prime movers such that the speed of at least one of the first and second prime movers can be varied without affecting the speed of the other;

a planetary gear assembly having a ring gear, sun gear and planetary carrier cage;

the first prime mover being coupled in a non-slip manner to the carrier cage;

the second prime mover being coupled in a non-slip manner to one of the ring and sun gears, the other of the ring and sun gears being coupled to an output shaft to drive a load, the output shaft serving to drive the load under most operating conditions;

the second prime mover being coupled to the sun gear and the ring gear being coupled to the output shaft;

means for operating the first and second prime movers each being operated at a speed greater than zero under all operating conditions, whereby the first and second prime movers each can be operated within a desired optimum speed range greater than zero for at least one train value of the planetary gear assembly.

2. The apparatus of claim 1 wherein the first and second prime movers comprise first and second reversible motors, respectively.

3. The apparatus of claim 1 wherein the first and second prime movers comprise first and second internal combustion engines.

* * * * *

UNITED STATES PATENT AND TRADEMARK OFFICE
CERTIFICATE OF CORRECTION

PATENT NO. : 4,825,721

DATED : May 2, 1989

INVENTOR(S) : Darcy Gabriele

It is certified that error appears in the above-identified patent and that said Letters Patent is hereby corrected as shown below:

In the Abstract:
The word "discret" should be --discrete--.

In the Specification:
Column 10, line 22, "plaetary" should be --planetary--.
Column 19, line 51, "deooted" should be --denoted--.
Column 21, line 13, "ar®" should be --are--.
Column 21, line 14, "n=$n'_s$" should be --$n_a=n'_s$--.
Column 26, line 15, "ne" should be --one--.
Column 26, line 24, "(i.e., P+Q>O)" should be --(i.e., P+Q=>O)--.

Signed and Sealed this

Sixth Day of November, 1990

Attest:

HARRY F. MANBECK, JR.

*Attesting Officer*   *Commissioner of Patents and Trademarks*